United States Patent
Vardakostas et al.

(10) Patent No.: US 9,386,799 B2
(45) Date of Patent: *Jul. 12, 2016

(54) SYSTEM AND METHOD FOR DISPENSING TOPPINGS

(71) Applicant: Momentum Machines Company, San Francisco, CA (US)

(72) Inventors: Alexandros Vardakostas, San Juan Capistrano, CA (US); Steven Frehn, San Francisco, CA (US); John Lawrence McDonald, Berkeley, CA (US)

(73) Assignee: Momentum Machines Company, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,637

(22) Filed: Jun. 6, 2013

(65) Prior Publication Data

US 2014/0154384 A1 Jun. 5, 2014

Related U.S. Application Data

(60) Provisional application No. 61/656,106, filed on Jun. 6, 2012.

(51) Int. Cl.
| | |
|---|---|
| *A23P 1/00* | (2006.01) |
| *A23P 1/08* | (2006.01) |
| *A21C 9/04* | (2006.01) |
| *A23L 1/00* | (2006.01) |

(52) U.S. Cl.
CPC . *A23P 1/086* (2013.01); *A21C 9/04* (2013.01); *A23L 1/0067* (2013.01)

(58) Field of Classification Search
CPC .................................... B26D 1/26; B26D 1/30
USPC ............. 99/450.5, 450.4, 325, 326, 357, 334, 99/352, 358, 355, 443 C, 443 R, 494, 451, 99/538; 426/274, 275, 574, 629, 641, 656, 426/634, 516–519, 531, 802
See application file for complete search history.

(56) References Cited

U.S. PATENT DOCUMENTS

| | | | |
|---|---|---|---|
| 3,342,307 | A | 9/1967 | Leach |
| 3,456,578 | A | 7/1969 | Pinsly |

(Continued)

FOREIGN PATENT DOCUMENTS

| | | | |
|---|---|---|---|
| EP | 0296496 | A | 12/1988 |
| WO | 9949277 | A | 9/1999 |

*Primary Examiner* — Phuong Nguyen
(74) *Attorney, Agent, or Firm* — Run8 Patent Group; Peter Miller

(57) ABSTRACT

One variation of a method for dispensing toppings onto topping vehicles includes: indexing a first topping vehicle to a first position adjacent a first topping module, the first topping module comprising a first hopper containing a first topping of a first topping type; indexing a second topping vehicle to a second position adjacent a second topping module comprising a second hopper containing a second topping of a second topping type; retracting a first blade of the first topping module; advancing the first blade through the first topping; retracting a first retaining plate to dispense a topping slice from the first topping onto the first topping vehicle according to a first topping order for the first topping vehicle specifying the first topping type, the first retaining plate offset from the first blade opposite the first hopper; advancing the first retaining plate; and indexing the first topping vehicle to the second position.

14 Claims, 7 Drawing Sheets

(56) References Cited

U.S. PATENT DOCUMENTS

| | | |
|---|---|---|
| 3,774,791 A | 11/1973 | Bornfleth |
| 3,780,643 A | 12/1973 | Papai |
| 3,887,964 A | 6/1975 | Richards |
| 4,246,462 A | 1/1981 | Meisel |
| 4,356,595 A | 11/1982 | Sandberg et al. |
| 4,513,656 A | 4/1985 | Fay |
| 4,567,819 A | 2/1986 | Adamson |
| 4,582,047 A | 4/1986 | Williams |
| 4,716,821 A | 1/1988 | Mally et al. |
| 4,723,614 A | 2/1988 | Lahti |
| 4,913,039 A | 4/1990 | Sutphen |
| 4,944,218 A * | 7/1990 | Cresson .................. 99/357 |
| 4,949,629 A | 8/1990 | Leary et al. |
| 4,951,648 A | 8/1990 | Shukla et al. |
| 5,033,366 A | 7/1991 | Sullivan |
| 5,113,753 A | 5/1992 | Robinson |
| 5,113,754 A | 5/1992 | Robinson et al. |
| 5,115,731 A | 5/1992 | Maitland |
| 5,184,538 A | 2/1993 | Ledet |
| 5,190,780 A | 3/1993 | Fehr et al. |
| 5,306,192 A * | 4/1994 | Caveza et al. .................. 446/71 |
| 5,377,492 A | 1/1995 | Robertson et al. |
| 5,379,633 A | 1/1995 | Flisram et al. |
| 5,441,035 A | 8/1995 | Liang-Chieh |
| 5,520,520 A | 5/1996 | Nakamoto et al. |
| 5,540,943 A | 7/1996 | Naramura |
| 5,566,817 A | 10/1996 | Meeker |
| 5,826,496 A | 10/1998 | Jara |
| 5,921,096 A | 7/1999 | Warren |
| 6,032,574 A | 3/2000 | Brayton et al. |
| 6,095,322 A | 8/2000 | Buysman et al. |
| 6,323,462 B1 | 11/2001 | Strand |
| 6,546,847 B2 | 4/2003 | Pilati et al. |
| 6,696,003 B2 | 2/2004 | Cediel et al. |
| 6,915,734 B2 | 7/2005 | Torghele et al. |
| 7,160,566 B2 | 1/2007 | Fink et al. |
| 7,216,490 B2 | 5/2007 | Joshi |
| 7,220,944 B2 | 5/2007 | Miller et al. |
| 7,370,749 B2 | 5/2008 | Smith |
| 7,581,476 B2 | 9/2009 | Freudinger et al. |
| 7,600,459 B2 | 10/2009 | Bodey et al. |
| 7,682,227 B1 | 3/2010 | Bifulco |
| 7,828,237 B2 | 11/2010 | Griffith et al. |
| 8,011,914 B2 | 9/2011 | Taylor et al. |
| 8,307,951 B2 | 11/2012 | Sus et al. |
| 2003/0200848 A1 | 10/2003 | Kuchler |
| 2004/0045975 A1 | 3/2004 | Leykin et al. |
| 2004/0208961 A1 | 10/2004 | Reckert et al. |
| 2005/0034588 A1 | 2/2005 | Schone et al. |
| 2005/0051566 A1 | 3/2005 | Leykin et al. |
| 2005/0199135 A1 | 9/2005 | Nishinomiya et al. |
| 2006/0237477 A1 | 10/2006 | Gregg |
| 2007/0023505 A1 | 2/2007 | Norton et al. |
| 2007/0196540 A1 | 8/2007 | Kirksey et al. |
| 2007/0265935 A1 | 11/2007 | Woycik et al. |
| 2008/0187637 A1 | 8/2008 | Spiegel |
| 2008/0313046 A1 | 12/2008 | Denenburg et al. |
| 2009/0056562 A1 * | 3/2009 | Julian et al. .................. 99/538 |
| 2009/0241481 A1 | 10/2009 | Sus et al. |
| 2011/0232440 A1 | 9/2011 | Weber |
| 2011/0256292 A1 | 10/2011 | Purgatorio et al. |
| 2012/0072311 A1 | 3/2012 | Khan |
| 2012/0078734 A1 | 3/2012 | Sus et al. |
| 2012/0179584 A1 | 7/2012 | Woycik et al. |
| 2013/0020330 A1 | 1/2013 | Luft et al. |

\* cited by examiner

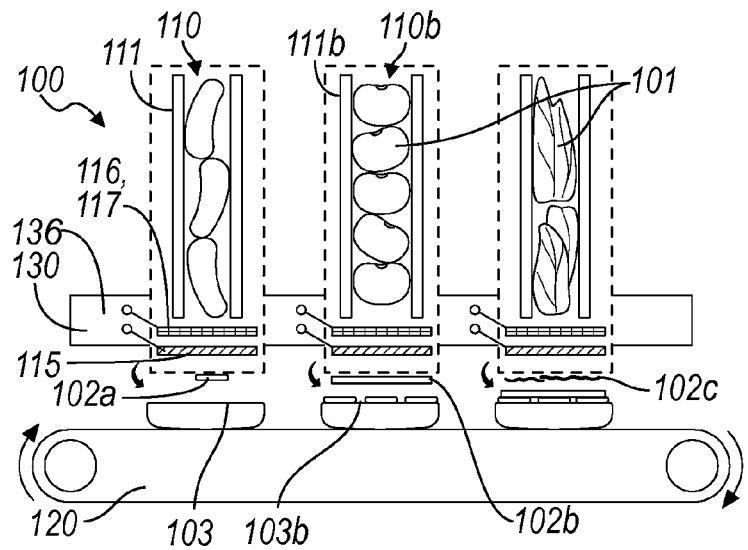
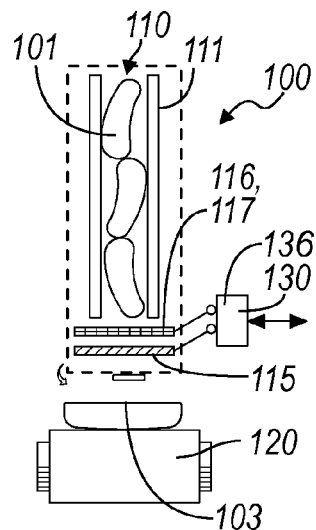
FIG. 1A  FIG. 1B
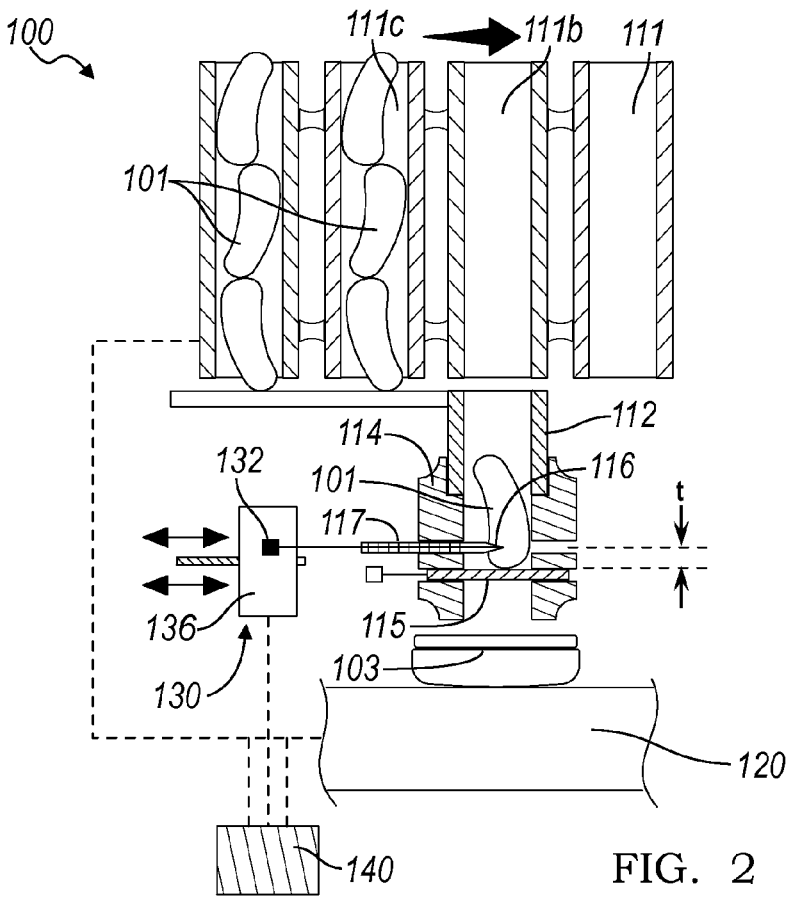
FIG. 2

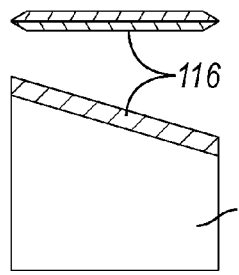 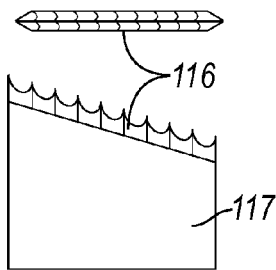 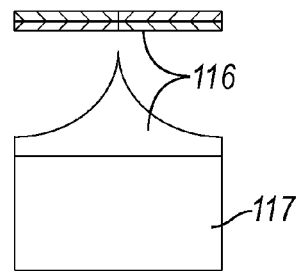
FIG. 9A    FIG. 9B    FIG. 9C
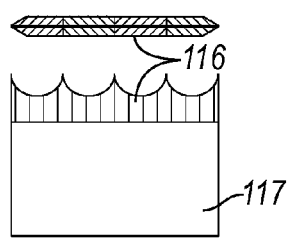 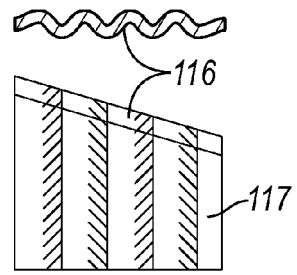
FIG. 9D    FIG. 9E
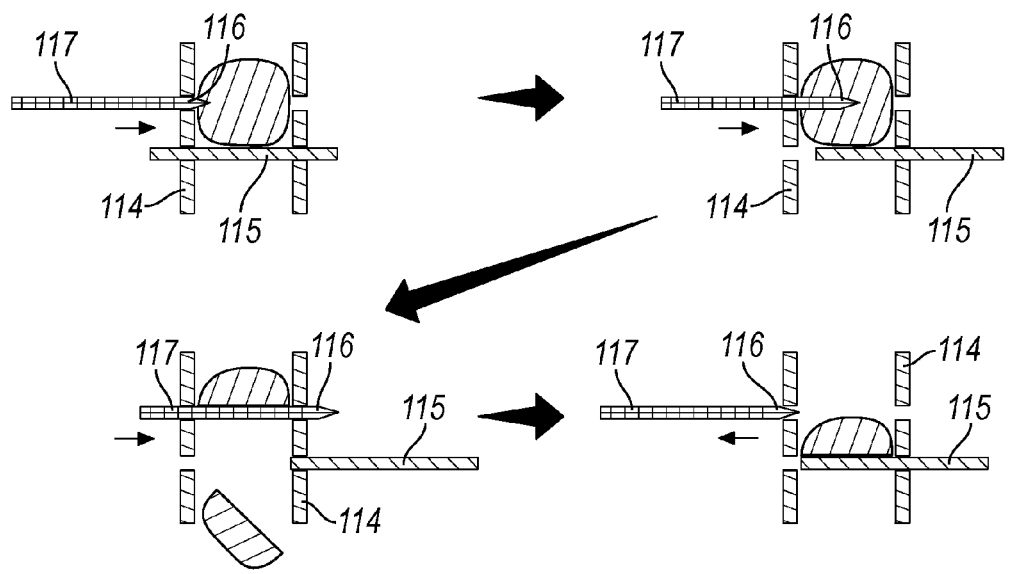
FIG. 10

SYSTEM AND METHOD FOR DISPENSING TOPPINGS

CROSS-REFERENCE TO RELATED APPLICATIONS

This application claims the benefit of U.S. Provisional Patent Application No. 61/656,106, filed 6 Jun. 2012, which is incorporated in its entirety by this reference.

TECHNICAL FIELD

This invention relates generally to the field of food preparation, and more specifically to a new and useful system and method for dispensing toppings in the field of food preparation.

BACKGROUND

Millions of hamburgers and sandwiches are assembled and delivered to patrons at the thousands of restaurant and fast-food locations throughout the United States. Patrons expect custom condiments and toppings, which conventionally necessitates human input to build a custom hamburger or sandwich. Thus, hamburger and sandwich assembly is typically labor-intensive and can leave room for mishandled food and incorrect or incomplete food orders.

BRIEF DESCRIPTION OF THE FIGURES

FIGS. 1A and 1B are schematic representations of a system of one embodiment;

FIGS. 2-4 are a schematic representations of several variations of the system;

FIGS. 9A-9E are schematic representations of variations of the system; and

FIG. 10 is a flowchart representation of a variation of the system.

DESCRIPTION OF THE EMBODIMENTS

Figure 3:
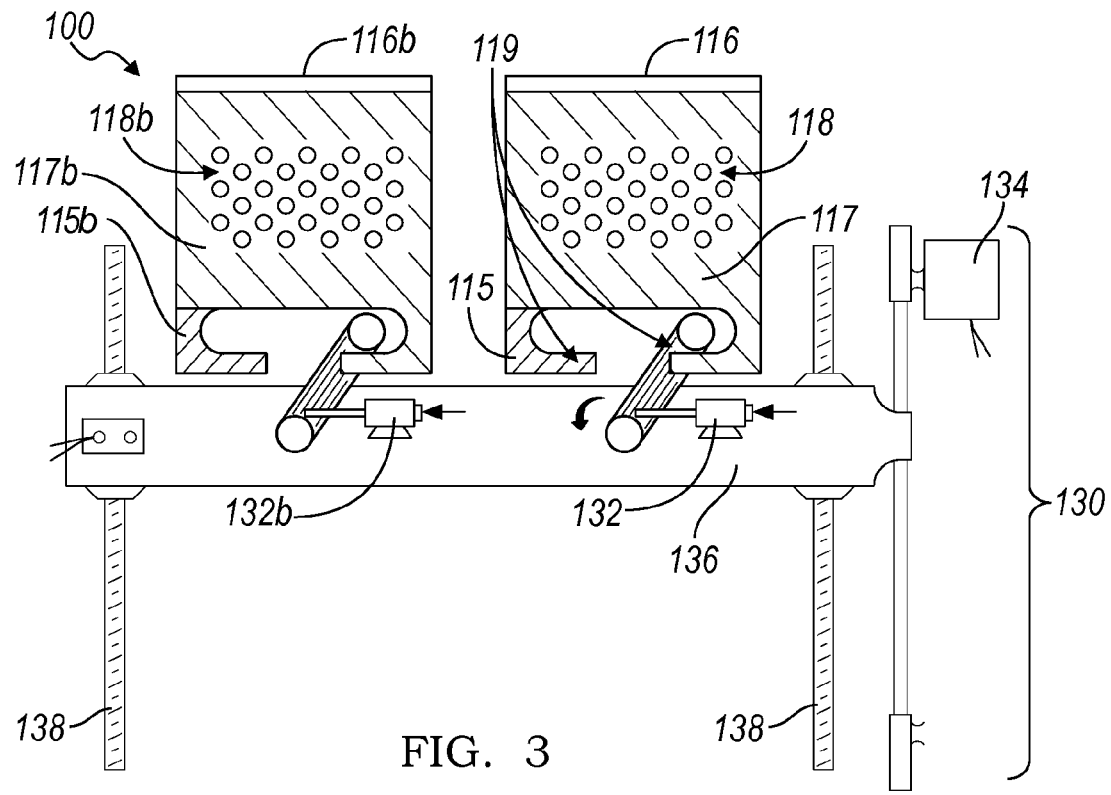

The following description of the embodiment of the invention is not intended to limit the invention to these embodiments, but rather to enable any person skilled in the art to make and use this invention.

1. System

As shown in FIGS. 1A and 1B, system 100 for dispensing toppings onto a topping vehicle includes: first topping module 110 including a first hopper in configured to dispense a first topping of a first topping type, a first blade 116 adjacent a discharge end of the first hopper in and configured to slice a topping serving from the first topping, and a first retaining plate 115 offset from and adjacent the first blade 116 opposite the first hopper 111; second topping module 110b including a second hopper 111b configured to dispense a second topping of a second topping type, a second blade 116b adjacent a discharge end of the second hopper 111b and configured to slice a topping serving from the second topping, and a second retaining plate 115b offset from and adjacent the second blade 116b opposite the second hopper 111b; a conveyor 120 configured to advance the topping vehicle from a first position adjacent the first topping module 110 to a second position adjacent the second topping module 110b; and a carriage 130 configured to retract and advance the first blade 116 and the first retaining plate 115 to dispense a topping serving from the first topping onto the topping vehicle in the first position and to retract and advance the second blade 116b and the second retaining plate 115b to dispense a topping serving from the second topping onto the topping vehicle in the second position.

System 100 generally functions to slice fresh toppings 101 and to selectively dispense topping servings (i.e., topping servings) 102a, 102b, 102c onto edible topping vehicles 103, 103b according to topping orders specific to each topping vehicle 103, 103b. System 100 can therefore automate fulfillment of custom topping orders specifying any combination of available toppings loaded into two or more topping modules by advancing edible topping vehicles through the topping modules and selectively slicing and dispensing topping servings from each topping module. In one example, system 100 can selectively and sequentially dispense slices of lettuce 102c, tomato 102b, onion, and pickle 102a from the lettuce, tomato, onion, and pickle topping modules, respectively, onto a stream of hamburger buns (i.e., edible topping vehicles) according to custom topping orders submitted by each patron in a restaurant. In this example, system 100 can receive a first custom topping order from a first patron and a second custom topping order from a second patron, assign the first custom topping order (and/or a hamburger patty, a custom topping or sauce order, etc.) to a first hamburger bun and the second custom topping order to a second hamburger bun, index the first and second (adjacent) hamburger buns through the topping modules, selectively dispense topping servings onto the first hamburger bun according to the first custom topping order, and selectively dispense topping servings onto the second hamburger bun according to the second custom topping order. Each topping module can define a 'stage' in a serial set of stages, and system 100 can thus enable substantially simultaneous assembly of multiple topping orders at various stages of build as multiple topping vehicles are advanced through the topping modules.

Topping modules within system 100 can be arranged substantially vertically over the conveyor 120 such that toppings within each topping module gravity feed into each slicing mechanism and thus onto topping vehicles supported by the conveyor 120 below. The conveyor 120 can index multiple topping vehicles though the topping modules simultaneously, as shown in FIG. 1A. In one example, the conveyor 120 aligns a first topping vehicle adjacent a first topping module, the first topping module dispenses a first topping serving onto the first topping vehicle, the conveyor 120 indexes the first topping vehicle into alignment with the second topping module, and the second topping module dispenses a second topping serving onto the first topping vehicle. In this example, the conveyor 120 can align a second topping vehicle—adjacent and succeeding the first topping vehicle—with the first topping module, and the first topping module can dispense a third topping serving onto the second topping vehicle. System 100 can thus implement topping orders to control dispensation of topping servings from each topping module onto each topping vehicle while multiple topping vehicles move through the various topping modules, wherein each topping order defines which toppings to dispense (and which not to dispense) onto an associated topping vehicle.

In this document, 'topping' and 'topping sample' refer to any sliceable topping and/or add-on for a sandwich, a hamburger, hot dog, a wrap, a taco, a burrito, a salad, a crepe, a bowl of soup, an omelet, or any other foodstuff. For example, system 100 can include six topping modules, wherein each topping module dispenses a different topping, such as lettuce, tomato, onion, pickle, hard-boiled egg, or avocado. Therefore, the topping vehicle can be any of a bun, a slice of bread, a tortilla, a taco, a bed of lettuce, soup within a soup container, a crepe, and omelet, etc. System 100 can additionally or alternatively dispense condiments, such as relish, ketchup, mustard barbecue sauce, salsa, hot sauce, etc.

System 100 can be a subsystem within an automated foodstuff assembly system including one or more other subsystems to prepare, assemble, and deliver other components of a foodstuff. For example, the automated foodstuff assembly system can include a patty grinding subsystem that grinds and presses custom hamburger patties from raw meat (e.g., based on custom patty orders), a patty grilling subsystem that grills patties (e.g., rare, medium, or well-done based on custom patty orders), a bun toaster subsystem that toasts each halve of a hamburger bun, system 100 that loads toppings onto bottom buns (e.g., based on custom topping orders), and a bagging subsystem that loads completed hamburgers into paper bags for delivery to patrons. System 100 can similarly assembly sandwiches, hotdogs, burritos, tacos, wraps, salads, beverages (e.g., smoothies, coffee drinks), or other foodstuffs, such as according to custom food orders. System 100 can therefore be incorporated into an automated foodstuff assembly to enable food order customization by selectively dispensing toppings according to topping orders specific to particular topping vehicles. However, system 100 can be a standalone device, incorporated into any other device or system, or implemented in any other way.

As shown in FIGS. 1A and 2, the first topping module 110 of system 100 includes a first hopper 111, a first blade 116, and a first retaining plate 115. The first hopper 111 is configured to dispense a first topping of a first topping type, the first blade 116 is adjacent a discharge end of the first hopper in and is configured to slice a topping serving from the first topping, and the first retaining plate 115 is offset from and adjacent the first blade 116 opposite the first hopper 111. Similarly, the second topping module 110b of system 100 includes a second hopper 111b, a second blade 116b, and a second retaining plate 115b. The second hopper 111b is configured to dispense a second topping of a second topping type, the second blade 116b is adjacent a discharge end of the second hopper 111b and is configured to slice a topping serving from the second topping, and the second retaining plate 115b is offset from and adjacent the second blade 116b opposite the second hopper 111b.

System 100 can include any number of topping modules, and each topping module can be configured to dispense one particular type of topping, such as lettuce, tomato, pickle, onion, mushrooms, bacon, cheese, hard-boiled egg, carrots, pineapple, peppers, scallions, cucumbers, sprouts, avocado, onion rings, French fries, a second halve of a bun, a deli meat, a prepared meat, a hotdog, a sausage, or a hamburger patty, etc. Each topping module within system 100 can include a hopper configured to dispense a topping of a particular topping type, a blade arranged adjacent a discharge end of the hopper and configured to slice a topping serving from the topping, and a retaining plate offset from and adjacent the blade opposite the hopper, wherein the retaining plate is configured to retain the topping prior to slicing and to release a topping serving once sliced by the blade. A blade and retaining plate pair within one topping module can therefore define a cutting mechanism.

Generally, each topping module can be configured to slice a topping serving from a fresh and/or relatively whole topping sample of a particular topping type. In one example, the first topping module is configured to dispense pickles. The first hopper 111 can thus define a geometry that accepts common pickle shapes (e.g., of a particular pickle variety and/or from a particular distributor), and the first hopper 111 can feed whole pickles into the first blade 116 (e.g., via gravity), wherein the blade is actuated by the carriage 130 to slice a pickle serving from an adjacent pickle. The carriage 130 can subsequently retract the retaining plate to dispense the pickle slice onto the topping vehicle. In this example, the second topping module can succeed (i.e., follow) the first topping module 110 and can be configured to dispense tomatoes, wherein the first hopper 111 feeds whole ripe tomatoes into the blade and the carriage 130 sequentially actuates the blade and the retaining plate to slice and then deposit a tomatoes serving onto the topping vehicle.

A hopper within a topping module can be arranged over a corresponding blade such that toppings may be gravity-fed through the hopper and into the blade. Alternatively, a hopper within a topping module can be angularly offset from vertical, and toppings can be additionally or alternatively actively fed through each hopper, such as with a lead screw arranged within the hopper can configured to displace toppings into corresponding blade.

A hopper of a particular topping module can define a cross-section of a size and/or geometry suitable for a topping type corresponding to the particular topping module. In one example, for the topping module corresponding to whole dill pickles, the hopper can be circular in cross-section with a 3" internal diameter, which can accommodate curved dill pickles with 1.5" to 2.5" outer diameters (though the hopper can have internal diameter of any other size to accommodate dill pickles of any other outer diameters). In this example, the topping module corresponding to whole dill pickles can include a set of hoppers, such as three hoppers of similar or substantially identical cross-section, each configured to dispense a dill pickles, wherein the carriage 130 can actuate the corresponding blade to slice a pickle serving from pickles in each of the set of hoppers in a single stroke. In another example, for the topping module corresponding to a hard cheese, the hopper can define a rectilinear cross-section of internal dimension accommodating a 0.2" gap on all sides of a standard cheese block fed through the hopper.

As described above, a topping module can include a set of adjacent hoppers. In this implementation, each hopper in the set of hoppers for the topping module can dispense the same type of topping. For example, the first topping module 110 can include three hoppers arranged concentrically (e.g., in a triangular pattern) about an axis parallel to the axes of the hoppers, and each of the three hoppers can dispense pickles. Alternatively, each hopper in the set of hoppers within the topping module can include a different topping type, such as commonly-paired toppings. For example, the first topping module 110 can include two parallel and adjacent hoppers, including one hopper configured to dispense pickled jalapenos and another hopper configured to dispense pickles carrots. In a similarly example, the first topping module no can include two parallel and adjacent hoppers, including one hopper configured to dispense cilantro and another hopper configured to dispense onion. In this implementation, carriage 130 can actuate the blade of the topping module to slice a topping serving from topping from each hopper in the topping module in the same cut stroke.

Figure 7:
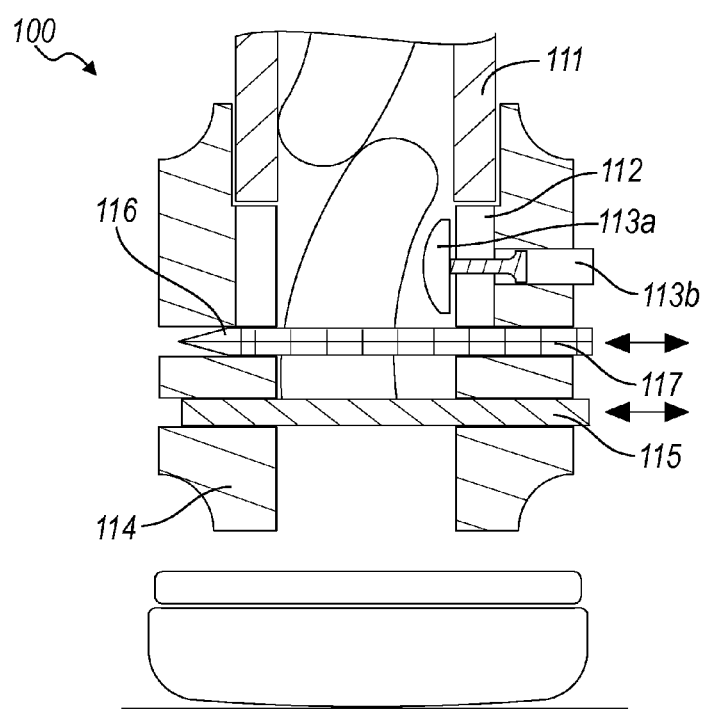
FIG. 7 is a schematic representation of one variation of the system.

The geometry and/or cross-section of a hopper within a topping module can be static. Alternatively, the effective internal diameter and/or internal geometry of a hopper can be adjustable. For example, a topping module can include a topping guide 113a (shown in FIG. 7) mounted within a corresponding hopper via a pivot and/or an adjustment screw proximal a discharge (i.e., output) end of the hopper. In this example, an operator can adjust the adjustment screw to advance or retract the topping guide 113a, thereby modifying an effect internal dimension of the corresponding hopper to a substantially optimal position for constraining a corresponding topping type. In another example, the topping guide 113a can be mounted within the hopper via a pivot and a chute actuator 113b (e.g., a solenoid, a rotary electric motor), as shown in FIG. 7, wherein the position of the chute actuator 113b is dynamically controlled to optimize the position of the topping guide 113a to constrain the specified topping for slicing. In this example, the chute actuator 113b can be controlled by a processor 150 that implements closed-loop feedback to maintain a near-constant application of cross-axial force on toppings as the toppings are fed through the hopper. In this example, the processor can interface with an optical sensor (e.g., a camera) adjacent the hopper and can implement machine vision to identify variations in size of toppings within the hopper and adjust the topping guide 113a accordingly. Alternatively, the processor can interface with a pressure sensor, a strain gauge, an ammeter, or any other suitable sensor to calculate a suitable force to apply to a topping within the hopper via the topping guide 113a and/or to calculate a suitable position for the topping guide 113a. In this example, the processor can also dynamically adjust the position of the topping guide 113a to manipulate a topping into slicing position within a corresponding slicing mechanism. However, each hopper can define any other geometry, cross-section, or dimension, can include any other active components, and/or can be adjusted or controlled in any other way.

In one variation of system 100 shown in FIG. 2, a topping module includes a chute 112 arranged between a corresponding blade and the discharge end of a corresponding hopper. Generally, the chute 112 of a topping module can be coupled to a corresponding cutting mechanism and configured to feed a topping sample into the blade while the hopper, once emptied, is replaced with another filled hopper or filled with additional topping samples. The chute 112 can therefore be of a length greater than a maximum anticipated length of a topping type designated for the topping module. Similarly, the chute 112 can define an axial length less than an axial length of a corresponding hopper. The corresponding hopper can thus be transiently (i.e., removably) coupled to the chute 112 opposite the cutting mechanism to feed topping samples into the chute 112 and thus into the cutting mechanism. Because the chute 112 can define an axial length greater than an anticipated maximum length of a corresponding topping type, the chute 112 can contain a substantially whole topping sample and the topping module can continue to dispense topping servings from the topping sample while the emptied hopper is replaced with another, full hopper or while the emptied hopper is removed, reloaded with additional topping samples, and replaced into the corresponding topping module.

As in the previous variation, a topping module can further include a hopper magazine configured to advance a succeeding hopper into a dispense position over a corresponding blade once topping samples in a preceding hopper are exhausted (e.g., once the last topping sample fully enters the corresponding chute 112). For example, the first topping module no can include a hopper magazine configured to support the first hopper 111 and a preceding hopper, both configured to dispense a topping of the first topping type, and the hopper magazine can be configured to advance the first hopper 111 into a dispense position over the first blade 116 in response to exhaustion of the preceding hopper. The magazine can therefore load multiple hoppers into a corresponding topping modules, such as by indexing subsequent hoppers into position over the chute 112 to feed topping samples into the corresponding slicing mechanism once a current hopper is emptied, as shown in FIG. 2. The magazine can support multiple hoppers in a linear fashion and index the hoppers linearly into axially alignment with a corresponding chute 112 of the topping module. For example, the processor can control any of a linear actuator according to an output of a linear encoder, a rotary actuator and lead screw according to an output of a rotary encoder, a Geneva mechanism, a solenoid and a linear indexing head, etc. to advance the magazine in a direction perpendicular to the conveyor 120 adjacent the corresponding topping module to load a succeeding full hopper into position. A topping module can also include a discrete magazine and actuator to enable independent indexing and reloading of hoppers in the corresponding topping module.

In this variation, a topping module can include a topping level sensor, wherein the processor reads an output of the topping level sensor to detect the level of topping samples in a dispensing position over the corresponding cutting mechanism. In this variation, the processor can thus index the magazine forward to load a succeeding (i.e., full) hopper into the dispensing position over the cutting mechanism once the current hopper is emptied (i.e., contains no further topping samples). In one example, the hopper within a topping module are of a translucent material, such as poly(methyl methacrylate) (PMMA, or acrylic), glass, or polycarbonates (PC), and the processor correlates an output of the topping level sensor that includes an optical sensor to estimate a height of topping samples within a hopper in the dispense position. In this example, the optical sensor can be substantially non-transiently arranged outside of and adjacent a hopper dispense position such that the processor can interface with the one optical sensor to detect topping levels in each hopper as the magazine indexes subsequent hoppers into the dispensing position. In this example, the topping level sensor can include an infrared emitter and detector. Alternatively, the topping level sensor can include a camera (e.g., an RGB camera), and the processor can implement machine vision to determine the topping level in a hopper over the cutting mechanism and/or the topping levels in multiple hoppers substantially simultaneously.

In another example, the processor interfaces the topping level sensor that includes a pressure sensor, a strain gauge, and/or a scale, etc. proximal the retaining plate to correlate a pressure-, strain-, and/or weight-related signal from the topping level sensor with a topping level in a hopper in the dispense position over the cutting mechanism. In yet another example, each hopper incorporates a mechanical limit switch that changes output state when the corresponding hopper is emptied. In a further example, the topping level sensor includes an acoustic sensor arranged over the hopper opposite the cutting mechanism and configured to output an acoustic signal into a hopper in the dispense position and to receive a reflected acoustic, wherein the processor interfaces with the acoustic sensor to correlate the reflected acoustic signal with a topping level in the hopper. However, a topping module can include any other suitable type and/or number of topping level sensors, and the processor can interface with the topping level sensor(s) in any other suitable way. Furthermore, once the processor determines that a current hopper is empty (i.e., a final topping sample has fully entered the corresponding chute 112), the processor can index the magazine forward to load a succeeding hopper in the dispense position.

Figure 8:
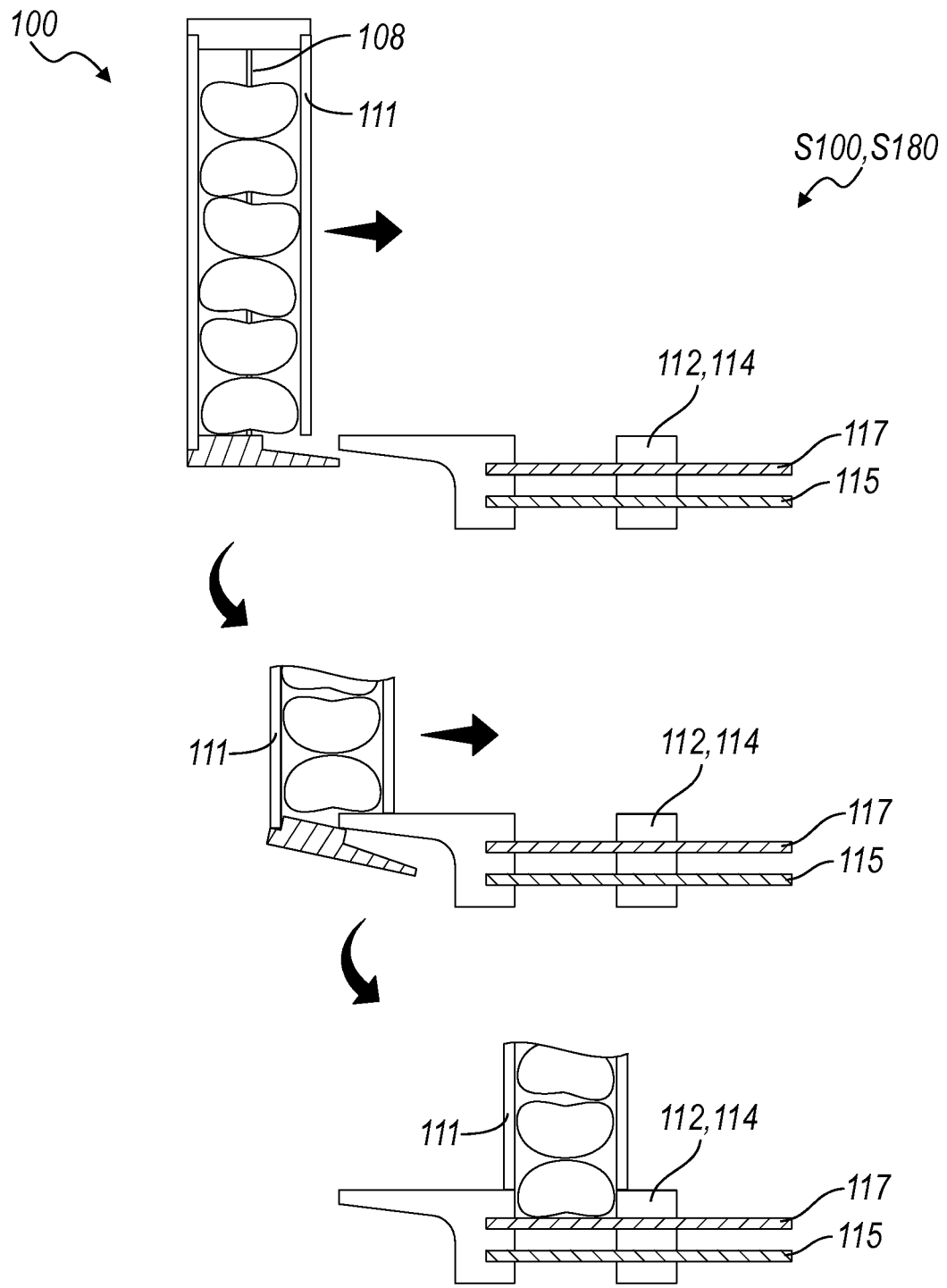
FIG. 8 is a flowchart representation of variations of the system and method.

Furthermore, in the foregoing variation and as shown in FIG. 8, a hopper can include a lid 109 arranged over (or in) a corresponding discharge end to support topping samples within the hopper during transport, such as between a preparation station and the magazine of the corresponding topping module. In one example, a hopper is closed on a far end opposite the discharge end, and an operator sets the hopper discharge end up on a preparation surface, loads the hopper with tomatoes (e.g., ten whole, ripe hot house tomatoes) via the discharge end, places the lid 109 over the discharge end, flip the hopper discharge end-down, and places the hopper into the magazine of a correspond (tomato) topping module. In this example, before the magazine indexes the hopper into the dispense position over the corresponding cutting mechanism the magazine can automatically remove the lid 109 from the hopper. Therefore, a lid 109 can engage a corresponding hopper to support the weight of topping samples when the hopper is full, and/or the magazine can include one or more features to enable automatic and systematic removal of the lid 109 from the hopper.

In one implementation, the lid 109 is circular in cross-section with a lip that engages less than the full circumference of the discharge end of the hopper, the lip interrupted by a ramp, as shown in FIG. 8. In this implementation, the hopper can include an alignment feature to maintain an arcuate position of the hopper along its longitudinal axis, and the magazine and/or the topping module can include a wedge that engages the ramp of the lid 109 to guide the lid 109 off of the hopper as the hopper is moved forward into the dispense position. For example, the wedge can be physically coextensive with the chute 113. In another implementation, the lid 109 includes two parallel wedge-shaped channels perpendicular to the longitudinal axis of the hopper, the hopper includes an alignment feature to maintain an arcuate position of the hopper along its longitudinal axis within the magazine, and the magazine includes a pair of ramps that engage the wedges in the lid 109 to guide the lid 109 off of the hopper as the hopper advances into the dispense position. However, the lid 109, the hopper, and/or the magazine can include any other suitable component and/or feature to enable automatic removal of the lid 109 from the hopper as the hopper is advanced into the dispense position adjacent the cutting mechanism.

A hopper can additionally or alternatively include a stake 108 arranged along (i.e., parallel to) the longitudinal axis of the hopper to maintain alignment of the topping samples as topping samples are fed into the cutting mechanism. In one implementation, the stake 108 can be mounted or fixed to the hopper opposite the discharge end of the hopper and proximal the longitudinal center of the hopper, and the cantilevered end of the stake 108 can extend up to (but not beyond) the discharge end of the hopper and include a pointed tip. In this implementation, an operator can load the hopper with topping samples by piercing topping samples with the pointed tip and pressing the samples down the stake 108. For example, the operator can load tomatoes into the hopper by removing the stem form a tomato, piercing the endocarp of the tomato along it concentric axis, pressing the tomato down the stake 108 with the stake 108 passing along the placenta of the tomato, and repeating for additional tomatoes until the hopper is full. Thus, in this example, the stake 108 can maintain topping samples in a particular orientation within the hopper, which can be useful to enable consistent topping serving sizes consistently cut across similar planes of various topping samples, such as consistently substantially perpendicular to the concentric axis of a tomato.

In the foregoing implementation, the stage can be of a uniform size and cross-section, such as 0.2" in diameter, and the stake 108 can be of a food-safe material, such as a stainless steel. The stake 108 can additionally or alternatively include a removable tip of a cross-section larger than the cross-section of a main section of the stake 108. For example, the stake 108 can include a removable 0.35"-diameter tip, wherein an operator places the tip over the discharge end of the stake 108, loads the hopper with topping samples, and removes the tip once the hopper is full. In this example, the removable stake 108 can create a bore, through loaded topping samples, that exceeds the diameter of the main section of the stake 108, which may substantially reduce a possibility that a topping sample will stick to stake 108 when the topping sample should otherwise advance toward the cutting mechanism in the topping module. Alternatively, in the foregoing example, the operator can leave the tip in place, place the lid over the tip, and the lid 109 can retain the tip such that the magazine removes the lid 109 and the tip as the hopper is advanced into the dispense position.

The hopper can additionally or alternatively include a weight arranged between loaded topping samples and a far end of the hopper opposite the discharge end, and the weight can be sizes to apply a suitable force to the topping samples to overcome a stiction (and/or other) force that may prevent a topping sample from advancing into the cutting mechanism. The weight can further engages a feature in the hopper, include an anchoring cable of a particular length, and/or include any other component or feature to prevent the weight from falling into the chute 112 and/or into the cutting mechanism.

Each hopper—and/or any component of system 100 that contacts a topping, the topping vehicle, or other foodstuff—can be of a food-safe material, such as stainless steel, glass, ceramic, polyethylene terephthalate (PET), or high-density polyethylene (HDPE). However, the hoppers can be of any other suitable material or combination of materials. The hoppers can also be of any other form or geometry, can be arranged or indexed into position over the cutting mechanism in any other suitable way, can be reloaded in any other suitable way and according to any other topping level sensor output, and can include any other feature or component to enable or assist topping loading and/or topping management.

In one variation of system 100, a topping module incorporates a heating element configured to heat, steam, sauté, or otherwise cook a topping sample passing through the hopper and into the cutting mechanism. For example, a topping module configured to dispense onion servings can include a heating element to heat and/or grill onions within a corresponding hopper. The heating element can be arranged outside and adjacent the dispense position over the cutting mechanism such that the same heating element can heat each succeeding hopper loaded into the dispense position. The heating element can also extend from adjacent the dispense position to an 'on deck' position and/or and 'in the hole position' for succeeding hoppers in the topping module such that the heating element can substantially simultaneously heat the contents of multiple hoppers substantially or 'preheat' hoppers prior to indexing into the dispense position. For example, the heater can define a planar heating surface arranged parallel to and offset from an indexing direction of the magazine. Alternatively, the topping module can include multiple heating elements, each arranged proximal or adjacent hopper positions for multiple succeeding hoppers containing topping samples. In one example, the heating element includes a quartz heater arranged between two hoppers within the magazine of the corresponding topping magazine, wherein the heating element moves with the two hoppers and heats the contents of the two hoppers substantially simultaneously. Alternatively, heating elements can be incorporated into hoppers such that a heater is replaced with a corresponding hopper as full hoppers are loaded into system 100 and empty hoppers are removed. In this implementation, the discrete heaters can heat the contents of various hoppers independently, which can yield control over topping cooking time and/or temperature. A topping module can similarly incorporate a cooling system configured to cool the contents of a hopper, such as to extend the freshness of the loaded topping samples. For example, a topping module can incorporate a liquid-to-air heat exchanger to extract heat from a hopper in the dispense position and/or one or more full hoppers in succeeding positions, such as to cool a hopper configured to dispense tomato servings or lettuce.

In the foregoing variation, system 100 can include a heat shield arranged between hoppers of adjacent topping modules to isolate heating and/or cooling to a particular topping module. In one example, system 100 can include a heat shield arranged between a heated onion module and an adjacent cooled lettuce module such that heating is isolated to the onion module to cook or sauté the onions and such that cooling is isolated to the lettuce module to extend the freshness of the lettuce.

A topping module can additionally or alternatively include a nozzle configured to spray or deposit steam, water, oil, butter, spices, and/or flavorings onto toppings within a corresponding hopper while contents of the hopper are heated, cooked, sautéed, cooled, within the hopper prior to and/or during dispensation of topping servings from the hopper. However one or more topping modules within system 100 can include other component or subsystem to maintain, modify, and/or improve the flavor of a corresponding topping type.

As shown in FIGS. 1A and 2, a blade in a corresponding topping module is configured to slice a topping serving from a topping sample fed into the cutting mechanism from an adjacent corresponding hopper. The blade can be a disposable blade configured to mount to a cutting plate 117, wherein the blade defines a leading edge of the cutting plate. Alternatively, the blade and the cutting plate can define a unitary structure. The carriage 130 can select and retract the cutting plate (and thus the blade) to release the topping sample into a cutting chamber between the cutting plate and a corresponding retaining plate, and the carriage 130 can subsequently advance the cutting plate into the cutting chamber to slice a serving from the topping sample.

In one example implementation shown in FIG. 9A, the blade includes a straight blade defining a straight cutting edge. Alternatively, the blade can include a serrated (shown in FIG. 9B), waveform (shown in FIG. 9D), or other cutting edge geometry along a leading edge of the blade. The blade can also include a combination of cutting edge geometries. For example, the cutting edge of a blade corresponding to a topping module configured to dispense tomato servings can define an acute angle with the direction of linear motion (i.e., advancement and retraction) of the blade, and a leading portion of the blade can be serrated to pierce the endocarp of a tomato sample, and the remainder of the blade can be straight to cleanly cut the remainder of the tomato sample. The leading edge of the blade can be linear, curvilinear, or of any other form or geometry. Alternatively, the blade can include multiple leading edges, such as a V-blade (shown in FIG. 9C) and/or of any other suitable form.

The blade can be substantially planar along the cutting edge, as shown in FIG. 9A. Alternatively, the blade can be non-planar along the cutting edge. For example, a topping module configured to dispense pickle servings can include a blade that defines a 'wave' form along the cutting edge and thus yield 'wavy' pickles, as shown in FIG. 9E. The cutting plate 117 can ride (e.g., as a running fit) within a blade guide 114 of a geometry similar to that of the first blade 116, as shown in FIGS. 2 and 7. As in the foregoing example, the cutting mechanism can include a blade guide defining a form that substantially matches the wave form of the cutting plate. The geometry of the blade guide 114 can thus provide support to the cutting plate throughout its throw and can prevent topping servings and/or topping debris from drawing between the blade and the blade guide. However, the blade, cutting plate, and/or blade guide can be of any other suitable shape, profile, or geometry.

Figure 4:
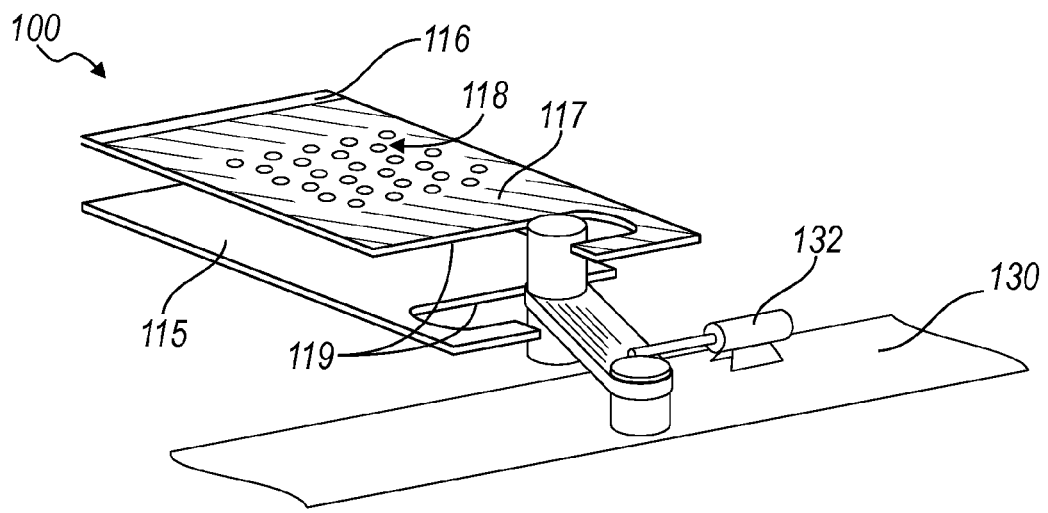

As shown in FIGS. 3 and 4, a broad face of the cutting plate can further define a perforated (e.g., low-surface-area) region 118 behind the blade. The perforated region 118 can be configured to contact the topping sample within the cutting mechanism when the blade is substantially fully advanced though the topping sample. In one implementation, the perforated portion includes a screen of woven material defining a set of opens arranged on the cutting plate, such as over an opening in the cutting plate behind the blade. In another implementation, the perforated region 118 includes a set of bores (i.e., perforations) directly in the cutting plate, such as a set of drilled, etched, machined, laser-cut, waterjet-cut, die-cut, stamped, or cast through-bores formed into the cutting plate behind the blade. In alternative implementations, the perforated region 118 includes any of a set of wrinkles, stamped divots, or formed troughs and valleys in the cutting plate behind the blade. However, the perforated region 118 can be of any other suitable geometry to reduce or minimize surface area contact between a serving cut from a corresponding topping and the cutting plate in a fully-advanced position. The perforated region 118 of the cutting plate 117 can therefore function to reduce surface adhesion, suction, hydrogen bonding, or other intermolecular adhesive forces between the cutting plate and a topping serving, which can substantially reduce a likelihood that a topping serving will cling to the cutting plate (after the retaining plate is retracted) rather than dropping onto a corresponding topping vehicle.

The cutting plate can additionally or alternatively include a grated blade. For example, for a topping module configured to dispense grated cheese, a corresponding hopper can dispense a whole block of cheese into a cutting chamber, and the cutting plate can include a cheese grater region (e.g., a region of sharpened or knife-edged perforations) configured to grate the cheese block to dispense grated cheese onto the topping vehicle. As in the foregoing example, a corresponding retaining plate can be arranged between the hopper and the cutting plate and can include a spike, clamp, or other feature to retain the cheese block over the cutting plate as cheese is grated from the cheese bock and deposited onto the topping vehicle. However, the blade, cutting plate, and/or retaining plate can be of any other form and can function in any other way to slice a topping serving from a topping sample.

A retaining plate can be arranged adjacent and offset a cutting plate opposite the hopper of a corresponding topping module. A retaining plate can be configured to retract, relative to the blade, to release a fresh topping serving onto a corresponding topping vehicle, and the retaining plate can be configured to advance, relative to the blade, to retain the sample topping within the cutting mechanism for a subsequent cut. As shown in FIG. 2, an offset distance between the retaining plate and a corresponding blade (or cutting plate) can define a thickness of a topping serving of a corresponding topping module.

In one implementation, the offset between a retaining plate and a corresponding blade can be static. Offsets between retaining plates and corresponding blades can also vary across topping modules within system 100. For example, the offset between a first blade 116 and a first retaining plate 115 corresponding to a first topping module 110 configured to dispense pickle servings can be approximately 0.2" (or between 0.15" and 0.35"), the offset between a second blade 116b and a second retaining plate 115b corresponding to a second topping module 110b configured to dispense tomato servings can be approximately 0.35" (or between 0.3" and 0.4"), and the offset between a second third blade and a third retaining plate corresponding to a third topping module configured to dispense onion servings can be approximately 0.15" (or between 0.1" and 0.2"). In this example, system 100 can thus yield pickle slices that are thinner than tomato slices and onion slices that are thinner than pickle slices. However, The system 100 can produce topping slices of any other similar, dissimilar, and/or varying thicknesses.

Alternatively, the offset between a retaining plate and a corresponding blade can be adjustable or customizable by an operator. In one example, the cutting mechanism includes a blade guide that supports the cutting plate and a retaining guide that supports the retaining plate, and the blade guide is assembled over the retaining guide with one spacer from a set of spacers of different thicknesses and/or with one or more spacers of the same or dissimilar thicknesses. In this example, an operator (or restaurant, franchise, etc.) can set a preferred thickness for each topping type by adjusting spacers within each cutting mechanism. In another example, the cutting mechanism includes a blade guide that supports the cutting plate and a retaining guide that supports the retaining plate, and the blade guide is assembled over the retaining guide with one or more turnbuckles. In this example, an operator can set a preferred thickness for each topping type by adjusting the turnbuckle(s). A restaurant, franchise, etc. implementing system 100 to assemble foodstuffs can thus differentiate itself from others that also implement system 100 to assemble (similar) foodstuffs by customizing serving thicknesses for various toppings.

In yet another implementation, the offset between a retaining plate and a corresponding blade can be adjustable substantially in real time, such as based on a topping order corresponding to a topping vehicle adjacent a corresponding topping module. In this implementation, the topping module can adjust the offset between retaining plate and a corresponding blade substantially in real time to enable custom topping serving thicknesses on a per-topping order basis. In one example, the cutting mechanism includes rectilinear a blade guide that supports the cutting plate and a rectilinear retaining guide that supports the retaining plate, and the blade guide can be coupled to the retaining guide via a set of turnbuckles at each corner of the guides. In this example, each turnbuckle can include a pulley, and the turnbuckles can be linked together via a timing belt operated by a rotary motor. In this example, the processor can implement a topping serving thickness specified in a topping order to control the rotary motor, thereby positing the blade guide and the retaining guide at a separation corresponding to the specified topping serving thickness. In a similar example, the blade guide (or the retaining guide) can substantially rigidly mounted, the retaining guide (or the blade guide) can be supported at each corner by a lead screw, each lead screw can include a pulley, and the lead screws can be linked together via a timing belt operated by a rotary motor. In this similar example, the processor can again implement a topping serving thickness specified in a topping order to control the rotary motor, thereby positing the retaining guide (or the blade guide) to achieve the specified topping serving thickness. In yet another example, the retaining guide is mounted below the cutting guide via a (kinematic) sliding mechanism, and the carriage 130 includes a ramp or actuator adjacent a plate selector, wherein the processor controls the ramp of the actuator as the carriage 130 advances into the topping module to modify the offset between the retaining plate and the corresponding blade. However, a topping module can function in any other way to enable real-time customization of a topping serving thickness by modifying the offset between corresponding a retaining plate and blade, and the processor can function in any other way to implement a topping order specifying a custom topping serving thickness.

The retaining plate and/or the cutting plate can also function to cook or heat a corresponding topping sample and/or a corresponding topping serving. In one example, a retaining guide within a corresponding topping module includes conductive leads that contact and supply current to the retaining plate, thereby heating the retaining plate and warming, cooking, or sautéing a leading face of a corresponding the topping serving in contact with the retaining plate. In another example, a coil adjacent the retaining plate heats the retaining plate via inductive heating, thereby heating an adjacent topping sample. Additionally or alternatively, the cutting plate can be similarly heated. For example, after a blade is advanced through a topping sample and before a corresponding retaining plate is retracted to dispense a topping serving from the topping sample onto a topping vehicle, the cutting plate can be heated to a high temperature (e.g., 800° F.) for a brief period of time (e.g., one second) to sear both a leading face of a topping sample and a trailing face of a topping serving currently within the cutting chamber. In this example, upon subsequent actuation of the blade and the retaining plate, the seared leading face of the topping sample can contact the retaining plate, the blade can be advanced through the topping sample to cut a second topping serving from the topping sample, and the cutting plate can again sear the trailing face of the second topping serving such that both sides of the second topping serving are seared by the cutting plate over two topping dispense cycles.

As in the foregoing implementation, a topping module with a heated cutting plate and/or a heated retaining plate, a corresponding cutting mechanism can also include a nozzle configured to spray or deposit steam, water, oil, butter, spices, and/or flavorings onto the cutting plate and/or onto the retaining plate, such as to improve heating or cooking of a topping serving, improve a flavor of a topping serving, and/or to prevent a topping sample or a topping serving from sticking to the cutting plate or to the retaining plate.

A blade, a cutting plate, and/or a retaining plate of a corresponding topping module can be of a food-safe material, such as 316L stainless steel. For example, the blade can be a ground stainless steel blade. The cutting plate and the retaining plate can be substantially 'two and one-half dimensional' structures and can be machined, etched, stamped, ground, drilled, sheared, or otherwise formed from sheet or plate in one or more single machining or manufacturing operations. As shown in FIGS. 3 and 4, each of the cutting plate and the retaining plate can further incorporate an engagement feature, wherein the carriage 130 is configured to selectively engage the engagement features 119 to sequentially advance and retract the cutting plate and the retaining plate to slice and then dispense a topping serving onto a topping vehicle. In one example implementation, the engagement features 119 are cut or formed into trailing regions of the cutting plate and the retaining plate, such as shown in FIGS. 3 and 4.

As shown in FIG. 2, a cutting plate can include a guide feature configured to engage a cutting guide, as described above, and the guide feature and the cutting guide can thus cooperate to constrain the cutting plate throughout its travel. For example, the guide feature and the cutting guide can cooperate to constrain the cutting plate in five degrees of freedom excluding a linear translation degree of freedom to enable the cutting plate to advance and retract. A retaining plate can similarly include a guide feature configured to engage a retaining guide, as described above, and the guide feature and the retaining guide can thus cooperate to constrain the cutting plate throughout its travel.

A blade (and cutting plate), a retaining plate, a cutting guide, and a retaining plate can define a cutting mechanism within a particular topping module. A corresponding chute 112 (described above) can seat in or otherwise engage the cutting guide to feed a topping sample from a corresponding hopper into the cutting chamber, and the retaining guide can physically coextensive with, assembled with, or otherwise coupled to the cutting guide opposite the hopper. The cutting guide and the retaining guide can also be disassemblable to enable blade replacement and/or cleaning of the cutting mechanism.

The cutting guide and/or the retaining guide can be of a food-safe polymer (e.g., PET or HDPE), to limit a need for lubricants and/or to limit wear between the cutting guide and the cutting plate and between the retaining guide and the retaining plate during operation. However, the blade, the cutting plate, the retaining plate, the cutting guide, and/or the retaining guide, etc. of a topping module can be of any other suitable material, geometry, form, manufacture, construction etc.

A hopper module can also include a waste chute configured to collect waste topping cuts and/or pass waste topping cuts away from the topping module. For example, when a new topping sample reaches a cutting plate, the processor can signal the waste chute to move to an engaged position, and the processor can trigger the carriage 130 to cycle a corresponding blade and retaining plate to slice a butt end off of the topping sample. In this example, the waste chute can collect the butt end of the topping sample and/or remove the butt end of the topping sample from the topping module such that the butt end of the topping sample is not dispensed onto the topping vehicle. The processor can similarly control the waste chute and the carriage 130 to dispose of the opposing butt end of the topping sample and the butt ends of subsequent topping samples. The processor can implement similar functionality to clear a butt end of first topping sample in a full hopper once indexed into the dispense position by the magazine. The method can interface with an optical sensor (e.g., an infrared sensor, an RGB camera), a mechanical switch, or any other suitable type of sensor to identify a butt end of a topping sample prior or during entry of the butt end into the cutting chamber. The processor can alternatively interface with an angle sensor configured to output a signal corresponding to an angle of an external surface of a topping sample, and the processor can cycle the carriage 130 until the external surface of a topping sample does not exceed a threshold angle, such as ±30° or ±45° from normal to the cutting plate.

The processor can also interface with a sensor configured to detect the diameter of a portion of the topping sample entering into the cutting chamber, and the processor can automatically adjust a topping thickness for the topping module in real-time (e.g., by adjusting an offset between the cutting plate and the retaining plate) to achieve a target topping serving volume. For example, an operator, restaurant, franchise, etc. can specify a target topping serving volume for a particular topping type across all topping orders. Alternatively, a patron can specify a topping serving volume for a particular topping type for his food order, or the processor can extrapolate a topping serving volume for a particular topping type from the patron's food order, such as based on a patron preference or order history.

The conveyor 120 of system 100 is configured to advance the topping vehicle from a first position adjacent the first topping module no to a second position adjacent the second topping module 110b. Generally, the conveyor 120 functions to move a vehicle module through subsequent stages (i.e., topping modules) of system 100, wherein a topping serving is selectively dispensed onto the topping vehicle in each stage according to a topping order corresponding to the topping vehicle. The conveyor 120 can thus cooperate with the topping modules to sequentially add topping servings to the topping vehicle to fulfill the corresponding topping order. The conveyor 120 can also move multiple adjacent topping vehicles through the stages of system 100 in series with a preceding topping vehicle nearer topping order completion than a succeeding topping vehicle. The conveyor 120 can thus sequentially align a topping vehicle with a cutting mechanism of each topping module, such as by supporting the topping vehicle with a support member configured to engage the topping vehicle and an actuator configured to move the support member through sequential the topping modules.

The conveyor 120 can manipulate the topping vehicle that includes any of a hamburger bun halve, a bread slice, a hard or soft tortilla, a piece or bed of lettuce, a bed of chip or fries, a cup or bowl of soup, a plate, a bowl, a pan, or any other suitable edible foodstuff or object capable of receiving topping servings.

The support member of the conveyor 120 can position the topping vehicle in-line (e.g., vertically) with an output of a cutting mechanism of one topping module at a time as the conveyor 120 advances the topping vehicle through the set of topping modules. In an example implementation in which the topping modules are arranged vertically over the conveyor 120 (i.e., relative to the ground), the support member can include a platen that constrains the topping vehicle vertically at a suitable distance from the output of each topping module, such as 2″ below the retaining plate of a corresponding topping module. Additionally or alternatively, the support member can include one or more tongues that substantially follow a (portion of a) perimeter profile of the topping vehicle. In one example, the tongues are of a flexible material, such as a high-durometer food-safe silicone elastomer, that conforms to the topping vehicle to hold the topping vehicle in a suitable position on the platen. The tongues can similarly include sprung rigid (e.g., sheet stainless steel) fingers to expand and retract to fit the topping vehicle. In another example, each tongues includes a cam follower configured to engage a cam channel along the length of the conveyor 120. In this example, the conveyor 120 can include a looped conveyor track that displaces the platen along the topping modules, and the conveyor 120 can include two mirrored cam channels that close the tongues around the topping vehicle before the topping vehicle enters the first stage (i.e., is aligned with the first topping module 110) and that opens the tongues to release the topping vehicle after the final stage. In this example, the conveyor 120 can loop the platen and corresponding tongues back to a starting position ahead of the first stage to receive and capture a subsequent topping vehicle. However, the tongues can be of any other, rigid, flexible, sprung, and/or guided configuration to support a topping vehicle on a platen throughout the topping stages of system 100.

The tongues can also extend from the platen to above a broad face of a topping vehicle and thus function as a funnel to guide topping servings from cutting mechanisms onto the broad face of the topping vehicle as the conveyor 120 moves topping vehicle through subsequent stages of system 100. The tongues can therefore guide topping serving placement on a topping vehicle, thereby enabling substantially accurate topping serving location when multiple topping servings are stacked on a topping vehicle. The support member can similarly include a rigid fence coupled to the platen to retain a topping vehicle and/or to guide topping serving placement onto the topping vehicle. However, the conveyor 120 can include any other component and/or implement any other suitable technique to retain a topping vehicle and/or to guide topping servings onto topping vehicles.

In one implementation, the conveyor 120 includes an actuator and a conveyor belt or chain configured to serially index the support member through the topping modules. For example, the conveyor belt or chain can be supported on each end of the topping modules by rollers, wherein at least one roller is powered by the actuator that includes a rotary electric, pneumatic, or other type of motor. The conveyor 120 can also include one or more guides or channels to support the conveyor belt or chain between the rollers. Alternatively, the conveyor 120 can include a robotic arm, an actuatable table, an independently-controlled mobile vehicle, or any other suitable device or actuator configured to serially moving a topping vehicle into position adjacent multiple topping modules, such as together with preceding and/or succeeding topping vehicles or independently of other topping vehicles. The conveyor actuator can be powered by an electric motor, such as with a 240V three-phase gearhead motor. Alternatively, the conveyor actuator can be powered pneumatically, hydraulically, manually (e.g., via a hand crank), or in any other way or with any other power source.

The processor can cooperate with the conveyor 120 to track the position of a topping vehicle as the topping vehicle is transported through system 100. In one implementation, the conveyor 120 includes a linear optical encoder and an optical reader, wherein the processor interfaces with the optical reader to detect a relative position of the encoder and to correlate the relative position of the encoder with a position of a topping vehicle within system 100. The processor can thus control the conveyor actuator according to the position of the topping vehicle to move the topping vehicle though subsequent stages of system 100. Alternatively, the conveyor 120 can include a powered roller (as described above), wherein rotary motion of the roller is transformed into linear motion of a conveyor belt or chain that displaces the support member retaining a topping vehicle, and the processor can interface with a rotary encoder and encoder reader coupled to the roller to read an angular position of the roller and to convert the angular position of the roller with a linear position of the support member (e.g., relative to a topping module). The processor can alternatively interface with a camera (e.g., an RGB camera) arranged proximal the conveyor 120 and/or a topping module, and the processor can manipulate an output of the camera, via machine vision, to determine a position of a topping vehicle relative to a topping module. The conveyor 120 can additionally or alternatively include one or more limit switches, and the processor can interface with the limit switch(es) to detect a position of the conveyor belt or chain, a position of a topping vehicle, and/or a position of a support member, and the processor can control the conveyor actuator accordingly. The conveyor 120 can additionally or alternatively include an acoustic sensor, a continuous-turn potentiometer or rheostat, a laser distance sensor, another type of rotary or linear encoder, or any other suitable sensor, and the processor can interface with the sensor and/or implement any other suitable signal analysis technique to track a position of the conveyor 120, a support member, and/or a topping vehicle moving through stages of system 100.

The carriage 130 of system 100 is configured to retract and advance the first blade 116 and the first retaining plate 115 to dispense a topping serving from the first topping onto the topping vehicle in the first position and to retract and advance the second blade 116b and the second retaining plate 115b to dispense a topping serving from the second topping onto the topping vehicle in the second position. Generally, the carriage 130 functions to operate blades of multiple topping modules in unison to slice topping servings from various topping samples substantially simultaneously, and the carriage 130 similarly functions to operate retaining plates of multiple topping modules in unison to dispense topping servings from various topping samples onto multiple topping vehicles substantially simultaneously.

In one implementation and as shown in FIG. 1A, system 100 includes multiple adjacent topping modules arranged linearly (i.e., sequentially). As shown in FIG. 3, the carriage 130 can include a beam 136, a first selection actuator 132 coupled to the beam 136 and configured to selectively engage the first blade 116 and the first retaining plate 115 of the first topping module no, a second selection actuator 132b coupled to the beam 136 and configured to selectively engage the second blade 116b and the second retaining plate 115b of the second topping module 110b, and a carriage actuator 134 configured to advance and to retract the beam 136. In this implementation, the selection actuators can be spaced along the beam 136 to align with blades and retaining plates of respective topping modules. Each selection actuator can therefore be paired with one topping module, wherein a selection actuator selectively engages a blade and a retaining plate of a corresponding topping module. When the carriage actuator 134 advances the beam 136, the beam 136 can further advance blades and/or retaining plates selected by the set of selection actuators. Additionally or alternatively, when the carriage actuator 134 retracts the beam 136, the beam 136 can further retract blades and/or retaining plates selected by the set of selection actuators. The carriage 130 can thus advance and retract multiple blades and/or retaining plates simultaneously according to positions (i.e., selections) of the selection actuators. The selection actuators can thus select cutting plates in various topping modules to load topping samples into cutting mechanisms of the various topping modules substantially simultaneously with a single retraction throw of the carriage 130, and the carriage 130 can complete an advancement throw to slice topping servings from topping samples in the various topping modules substantially simultaneously. The selection actuators can further select retaining plates in the various topping modules to dispense topping servings from the various topping modules onto adjacent topping vehicles substantially simultaneously with a single retraction throw of the carriage 130, and the carriage 130 can complete an advancement throw to return the retaining plate to complete the current topping serving dispense cycle and prepare for a subsequent cycle. During or soon after the carriage 130 advances the retaining plate at the close of a topping serving dispense cycle, the conveyor 120 can advance the topping vehicle(s) to a subsequent topping module.

In this implementation, as a topping vehicle advances through successive topping modules, the processor can control the position of each selection actuator according to the topping order for the topping vehicle to dispense only topping servings specified for the topping vehicle. For example, if a topping order for a corresponding topping vehicle does not specify pickles or specifies no pickles, the processor can maintain a selection actuator corresponding to a pickle module in a retaining plate selection state during a topping serving dispense cycle such that a pickle sample is not loaded into the corresponding cutting mechanism and such that a pickle serving is not dispensed onto the topping vehicle.

The conveyor 120 can thus substantially simultaneously position multiple topping vehicles adjacent a topping module in system 100 such that multiple topping vehicles on the conveyor 120 can receive a topping serving from an adjacent topping module—if specified by corresponding topping orders—substantially simultaneously for one topping serving dispense cycle. The conveyor 120 can then index the topping vehicles forward, thus receiving a new topping vehicle at an input end of the conveyor 120 and delivering a completed topping vehicle (i.e., a topping vehicle loaded with all designated toppings) at the output end of the conveyor 120, and the carriage 130 can complete a subsequent topping serving dispense cycle to dispense a subsequent set of topping servings onto the new set of topping vehicles (i.e., excluding the completed topping vehicle and including the new topping vehicle).

In this variation, a selection actuator can include an electromechanical actuator (e.g., a linear solenoid) configured to selectively engage an engagement feature of a corresponding blade in a first position and configured to engage an engagement feature of a corresponding retaining plate in a second position. The actuator can thus switch between two or more states (i.e., positions) to select one or the corresponding retaining plate and the corresponding cutting plate. In this implementation, a blade and a retaining plate within a topping module can include opposing engagement features 119 that define hooks (shown in FIG. 4), and, when the carriage 130 is in a fully advanced position, a corresponding selection actuator can displace a pin between the hook of the blade and the hook of the retaining plate to select one of the two. Alternatively, the blade and the retaining plate can include or can be coupled to a ferrous (i.e., magnetic) material, and a corresponding selection actuator can include two electromagnets, each paired with one or the blade and the retaining plate such that the processor can selective activate one of the two electromagnet of the selection actuator to select one of the blade and the retaining plate. Similar, the blade can include or can be coupled to a magnetic material polarized in a first direction, the retaining plate can include or can be coupled to a magnetic material polarized in a second opposing direction, and the selection actuator can include an electromagnet, wherein the processor reverses the polarity of the electromagnet to select between the blade and the retaining plate. However, a selection actuator can include any other type of actuator, such as a rotary electromechanical actuator, a pneumatic or hydraulic actuator, an electromagnet, or a mechanical cam and latch (e.g., that switches states with at the end of each carriage 130 advancement unless blocked by the processor according to a corresponding topping order), and the processor can control each selection actuator in any other suitable way.

In this implementation and as shown in FIG. 3, the beam 136 of the carriage 130 can ride on one or more linear tracks 138 or 'ways,' such as a one track of circular cross-section proximal each end of the beam 136. In this implementation, the beam 136 can be coupled to the carriage actuator 134 via a timing belt, a connecting rod, or a lead screw, etc. to drive the beam 136 along the track(s) 138. However, the beam 136 can ride on any other suitable type of track or guide of any other shape or geometry, and the beam 136 can be coupled to the carriage actuator 134 in any other suitable way.

In another implementation, the carriage 130 includes two beams, including a cutting beam and a retaining beam. In this implementation, the cutting beam can include selection actuators controlled by the processor to select and to deselect blades for various topping modules according to topping orders for topping vehicles currently on the conveyor 120, such as described above. Similarly, the retaining beam can include selection actuators controlled by the processor to select and to deselect retaining plates for various topping modules according to topping orders for topping vehicles currently on the conveyor 120, such as described above. The cutting beam and the retaining beam can be driven together, such as by one carriage actuator 134, or independently, such as by two independently-controlled carriage actuators.

In yet another implementation, the carriage 130 includes a set of phased crank pairs, wherein each crank pair includes a blade crank coupled to a corresponding cutting plate and a retaining crank coupled to a corresponding retaining plate. The set of crank pairs can be actuated via share a common lay shaft (or crankshaft) such that rotation of the lay shaft (i.e., by the carriage actuator 134) actuates all or a selection of blades out of phase (e.g., 180° out of phase) with all or a selection of the retaining plates. In this implementation, a blade crank and a retaining crank can be coupled to the lay shaft via a cam or eccentric such that the cranks translate rotary motion of the lay shaft into linear or curvilinear motion at the blades and retaining plates. The carriage 130 can further implement a quick-return or Whitworth linkage such that speed of advancement differs from speed of retraction of the blades and/or retaining plates. A quick-return or Whitworth linkage can thus enable fast advancement of a blade through a corresponding topping sample, which may yield cleaner topping cuts. A quick-return or Whitworth linkage can also enable slow retraction of a retaining plate, which may minimize damage to a serving slice. Furthermore, a retaining crank and a corresponding cutting crank can be phased by other than 180°. For example, a crank pair can be phase by 150° such that a retaining plate begins a retract stroke before a corresponding blade is fully advanced. Alternatively, blades of the topping modules can be coupled to a first lay shaft, and retaining plates of the topping modules can be coupled to a second lay shaft that is driven out of phase (e.g., variably) with the first lay shaft. The lay shaft(s) can be actuated at a constant speed and in a constant direction, at a variable speed and/or direction, at a constant or variable phase (if applicable) etc.

In other implementations, the carriage 130 includes one beam per topping module, wherein the processor controls an carriage actuator 134 and a selection actuator for each topping module to selectively dispense topping servings onto corresponding topping vehicles. However, the carriage 130 can include any other number of carriages, carriage actuator, selection actuators, etc. of any other arrangement and controlled in any other suitable way to enable advancement and retraction of the blades and retaining plates of the topping modules.

In still another implementation, a cutting plate and a retaining plate in a corresponding topping module can be actuated in unison (e.g., locked in phase, substantially rigidly linked). In one example, the cutting plate is vertically offset from the retaining plate by the desired topping thickness, the leading edge of the blade substantially over a trailing edge of the retaining plate, as shown in FIG. 10. In this example implementation, a topping dispense cycle can begin with the cutting plate/retaining plate assembly fully advanced. A corresponding selection actuator can subsequently select the cutting plate/retaining plate assembly (according to a corresponding topping order), and the carriage 130 can retract the cutting plate/retaining plate assembly, thereby retracting the blade and loading the corresponding topping sample into the cutting chamber in a single retraction stroke, as shown in FIG. 10. The carriage 130 can subsequently advance the cutting plate/retaining plate assembly, thereby slicing a topping serving from the topping sample and dispensing the topping serving in a single advancement stroke, as shown in FIG. 10. Therefore, as in this implementation, the carriage 130 can complete a topping dispense cycle in a one advancement stroke and one retraction stroke.

In the forgoing variations and implementations, the carriage 130 can advance and retract a blade linearly and planar to a broad face of the blade. The carriage 130 can similarly advance and retract a retaining plate linearly and planar to a broad face of the retaining plate. However, the carriage 130 can advance and retract a blade and/or a retaining plate in an arcuate, elliptical, circular, oscillatory, or other motion. The carriage actuator 134 can be a rotary actuator, such as a DC electric motor, a servo motor, a stepper motor, a pneumatic motor, etc., and the rotary motion actuator can be coupled to the beam 136 via a timing belt, a chain, a crank, or any other suitable linkage. Alternatively, the carriage actuator 134 can be a linear actuator, such as a solenoid, a pneumatic ram, DC electric linear actuator, etc. Furthermore, the carriage actuator 134 include a mechanical, electromechanical, pneumatic, hydraulic, piezoelectric, or other type of actuator to motivate the carriage 130, blades, and/or retaining plates along a linear, curvilinear, arcuate, elliptical, or other path.

As shown in FIG. 2, one variation of system 100 further includes a processor configured to control selection of the first blade 116 and the first retaining plate 115 by the carriage 130 according to a topping order specifying the first topping type for the topping vehicle. Generally, the processor functions to control selection of blades, selection of retaining plates, actuation of the carriage 130, and the position of the conveyor 120 to advance topping vehicles through the topping modules and dispense topping servings onto the topping vehicles according to corresponding topping orders. The processor can therefore control various components of system 100 to fulfill custom topping orders specific to various topping vehicles at various stages of build within system 100.

The processor can thus maintain and implement a topping order corresponding to each topping vehicle in system 100. Generally, a topping order can specify which topping types are to be deposited on a corresponding topping vehicle, and the processor can implement a topping order by selectively controlling which blades and which retaining plates are selected by the carriage 130 during each carriage cycle as the conveyor 120 indexes the topping vehicle through the topping modules. For example, for a topping vehicle associated with a particular topping order, when the topping vehicle is indexed to a first position (i.e., aligned with the first topping module no), if the topping order includes a request for the first topping type corresponding to the first topping module no, the processor can control a selection actuator corresponding to the first topping module 110 to sequentially select the first blade 116 and the first retaining plate 115 and actuate the carriage 130 to dispense a topping serving of the first topping type onto the topping vehicle. Furthermore, when the topping vehicle is indexed forward into a second position (i.e., aligned with the second topping module 110*b*), if the topping order does not include a request for a second topping type dispensed by the second topping module 110*b*, the processor can control a corresponding selection actuator to prevent dispensation of a topping serving from the second topping module nob onto the topping vehicle during a subsequent carriage cycle.

The processor can receive a topping order from a patron, such as through a customer interface (e.g., a touchscreen) coupled to system 100, through a wireless connection to a mobile computing device (e.g., a smartphone) carried by the patron, or routed from a mobile computing device carried by the patron, through a computer network (e.g., the Internet), to the processor. In one example, the customer interface is accessible through a native application executing on a personal mobile electronic device, such as a cellular phone, a smartphone, or a tablet. In another example, the customer interface is accessible through a web browser executing on an electronic device, such as a cellular phone, a smartphone, a tablet, or a desktop computer.

The topping order can be a component of a complete hamburger order that also includes a custom patty order (e.g., meat type, doneness), a sauce or condiment order (e.g., ketchup, mustard, relish, barbecue sauce), and/or a bun order (e.g., bun type, bun toast level), etc. For example, in one implementation described above in which system 100 is a subsystem of an automated hamburger making machine and wherein the topping vehicle is a halve of a hamburger bun, the complete custom hamburger order can include a topping order specifying lettuce, onion, pickle, and tomato, a condiment order specifying ketchup, mayonnaise, mustard, and relish, and patty order specifying a medium-rare ½ lb. beef patty. In this example, system 100 can include multiple topping modules, each dispensing a distinct topping type, including one of lettuce, onion, pickle, and tomato. The automated hamburger making machine can also include separate dispensers for ketchup, mayonnaise, mustard, and relish and a custom patty grinding subsystem and patty grilling subsystem. Furthermore, in this example, a hopper of a corresponding topping module can be configured to accept fresh produce, to slice the fresh produce, and to dispense servings from the fresh produce onto hamburger buns. The topping order can similarly be a component of a complete sandwich order, a complete salad order, a complete burrito order, etc. and implemented by the processor within an automated salad, salad, burrito, or other foodstuff assembly machine.

The processor can store a topping order on a data storage module, such as in the form of an array of pointers indicating which toppings to dispense and which toppings not to dispense onto a corresponding topping vehicle. The processor can thus step through a pointer array as a corresponding topping vehicle is indexed through the topping modules. The processor can also step through a pointer array for each of multiple topping vehicles as the topping vehicles progress through the topping modules. For example, the processor can implement a particular pointer in each array for the various topping modules according to the current stage of each topping vehicle in system 100. However, the processor can handle one or more topping orders in any other suitable way to control topping dispensation onto one or more topping vehicles.

The processor can also incorporates feedback mechanisms to control operation of any one or more components of system 100. In one implementation, the carriage 130 includes an encoder, a camera, a limit switch, an acoustic sensor, a continuous-turn potentiometer or rheostat, or a laser distance sensor, etc., and the processor implements an output of the sensor to determine the position of the carriage 130 and to implement closed-loop feedback to manipulate the position of the carriage 130. The carriage 130 can similarly include a tension sensor in a timing belt coupled to the carriage actuator 134, a strain gauge proximal a beam-track junction, a pressure sensor adjacent a cutting plate-beam contact area, etc., and the processor can implement outputs from any of the foregoing sensors to monitor actuation of the carriage 130, to detect a total cutting forces across all blades, and/or to detect a cutting forces for individual blades. For example, the processor can correlate a signal from a pressure sensor or a strain gauge proximal a contact area between the beam 136 and the carriage 130 with a sharpness of a corresponding blade. In this example, the processor can trigger an alarm, throw a flag, and/or alert an operator, etc. if the determined blade sharpness drops below a threshold sharpness. In a similar example, the processor correlates a current draw of an electric carriage actuator 134 (measured with an ammeter) advancing the carriage 130 with a sharpness of one or more blades in system 100, and the processor further triggers an alarm in response to a determined blade sharpness below a threshold blade sharpness. A topping module can also include an optical (e.g., infrared) sensor, a mechanical sensor, or other sensor adjacent an output end of a corresponding cutting mechanism, and the processor can monitor an output of the sensor to confirm that a topping serving was deposited from the topping module as expected. In this implementation, if deposition of a topping serving from a particular topping module was not detected by the processor, the processor can repeat the previous topping dispense cycle for the particular topping module (but deselect all other topping modules) to attempt successful deposition of a topping slice from the particular topping module. Furthermore, in this implementation, if a topping slice is not dispensed from the particular topping module after a threshold number of attempts (e.g., two), the processor can trigger an alarm, throw a flag, and/or alert an operator, etc. Additionally or alternatively, the processor can increase the speed of a cut stroke of the carriage 130 to compensate for blade wear, such as in response to an output from a force sensor coupled to the carriage 130 that exceeds a threshold force level indicating blade wear.

In another implementation, the processor receives an output from an ammeter electrically coupled to the conveyor actuator, and the processor maintains a conveyor actuator current draw below a threshold current draw in order to extend a user life of the conveyor actuator. The processor can also receives signals from encoders or other rotary or linear position sensors throughout system 100 and matches cycle times and positions of multiple components with the speed and position of the conveyor 120.

As described above the processor can also receive a signal from a hopper level sensor and control a corresponding hopper magazine to index a full hopper into a dispense position when the hopper level sensor indicates that a current hopper is empty (e.g., a final topping sample has fully entered a corresponding chute 112). The processor can also interface with an optical sensor (e.g., a camera) arranged over the conveyor 120 and implement machine vision to determine the stability of a topping stack on a topping vehicle passing through the topping modules. In this implementation, the processor can adjust the speed of the conveyor 120 to substantially ensure that toppings in the topping stack do not fall off of the topping vehicle and/or to substantially ensure that additional topping servings properly settle on the current topping stack. However, the processor can receive any other signal from any other sensor within system 100 and can control any one or more components in system 100 according to one or more sensor signals and/or in any other suitable way.

2. Method

Figure 5A:
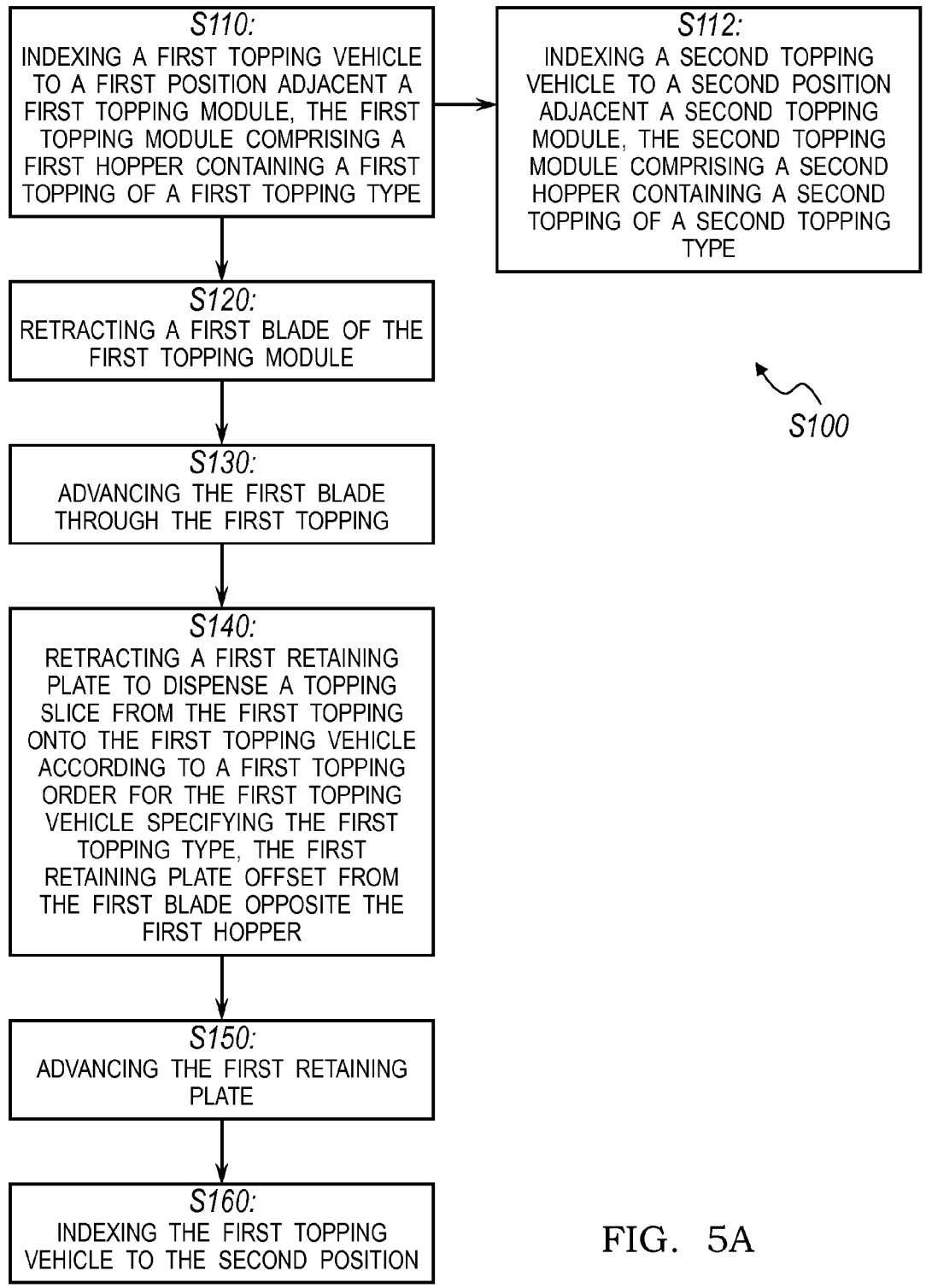
FIG. 5A is a flowchart representation of method of one embodiment.

As shown in FIG. 5A, method Silo for dispensing toppings onto topping vehicles includes: indexing a first topping vehicle to a first position adjacent a first topping module 110 in Block S110, the first topping module 110 comprising a first hopper 111 containing a first topping of a first topping type; indexing a second topping vehicle to a second position adjacent a second topping module 110b in Block S112, the second topping module 110b comprising a second hopper 111b containing a second topping of a second topping type; retracting a first blade 116 of the first topping module 110 in Block S120; advancing the first blade 116 through the first topping in Block S130; retracting a first retaining plate 115 to dispense a topping slice from the first topping sample onto the first topping vehicle according to a first topping order for the first topping vehicle specifying the first topping type in Block S140, the first retaining plate 115 offset from the first blade 116 opposite the first hopper 111; advancing the first retaining plate 115 in Block S150; and indexing the first topping vehicle to the second position in Block S160.

Figure 6:
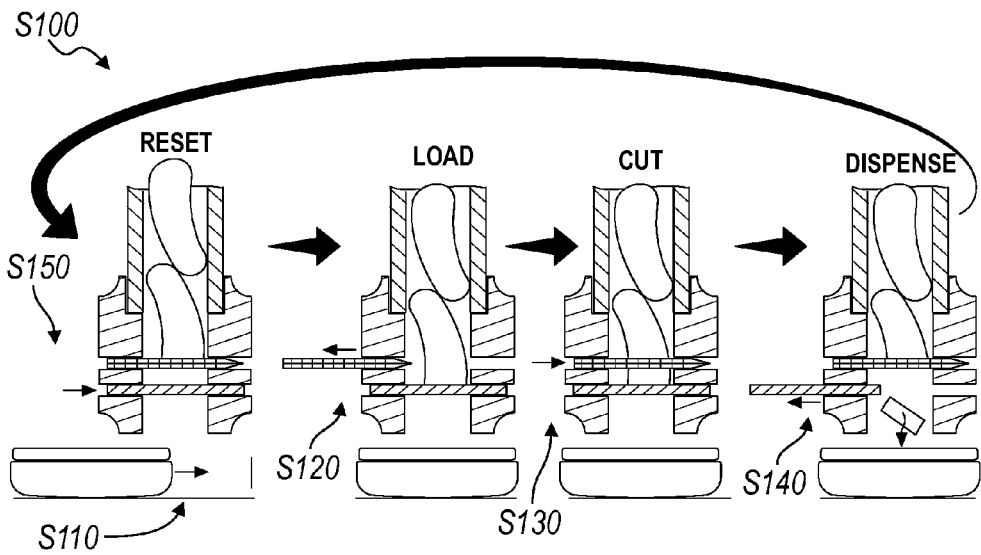

Generally, the method can be implemented by system 100 described above to dispense topping servings onto topping vehicles. Blocks S110, S112, and S160 can be controlled by the processor and implemented by the conveyor 120 of system 100 described above, and Blocks S120, S130, S140, and S150 can be controlled by the processor and implemented by the carriage 130 of system 100 described above. Blocks S120, S130, S140, and S150 can also define a load stroke, a cut stroke, a dispense stroke, and a reset stroke, respectively, as shown in FIG. 6.

Block S110 of method S100 recites indexing a first topping vehicle to a first position adjacent a first topping module no, the first topping module no comprising a first hopper in containing a first topping of a first topping type. Similarly, Block S112 of method S100 recites indexing a second topping vehicle to a second position adjacent a second topping module 110b, the second topping module 110b comprising a second hopper 111b containing a second topping of a second topping type. Generally, Blocks S110 and S112 function to position a first and a second topping vehicle into positions to receive a topping serving from a first topping module no and to receive a topping serving from a second topping module 110b, respectively, as described above.

Block S120 of method S100 recites retracting a first blade 116 of the first topping module no. Generally, Block S120 defines a load stroke in which the blade of a corresponding topping module is retracted, thereby enabling a topping sample to advance through a corresponding hopper and into a corresponding cutting chamber. Once a portion of the topping sample advances into the cutting chamber, the topping sample can be retained by a corresponding retaining plate in a fully-advanced position. As described above, the processor can implement Block S120 by controlling a corresponding selection actuator to select the cutting plate and subsequently controlling the carriage actuator 134 to retract the selected cutting plate.

Block S130 of method S100 recites advancing the first blade 116 through the first topping. Generally, Block S130 defines a cut stroke in which the blade of a corresponding topping module is advanced, thereby slicing a topping serving from the corresponding topping sample. Once the cutting plate is advanced in Block S130, the cutting serving is trapped between the cutting plate and the retaining plate. As described above, the processor can implement Block S130 by controlling the carriage actuator 134 to advance the selected cutting plate into the topping sample.

Block S140 of method S100 recites retracting a first retaining plate 115 to dispense a topping slice from the first topping onto the first topping vehicle according to a first topping order for the first topping vehicle specifying the first topping type, the first retaining plate 115 offset from the first blade 116 opposite the first hopper 111. Generally, Block S140 defines a dispense stroke in which the retaining plate of a corresponding topping module is retracted, thereby releasing a topping serving from the topping module. Block S130 can therefore rely on gravity (at least in part) to drop a topping serving from the topping module on the topping vehicle below. As described above, the processor can implement Block S140 by switching the corresponding selection actuator from the cutting plate to the retaining plate and subsequently controlling the carriage actuator 134 to retract the selected retaining plate. As the retaining plate retracts in Block S140, the topper serving can be pushed off the retaining plate via a sidewall of a corresponding retaining guide, as described above, and thus drop onto an adjacent topping vehicle.

Block S150 of method S100 recites advancing the first retaining plate 115. Generally, Block S150 defines a reset stroke in which the retaining plate of is advanced back through the cutting chamber. Following Block S150, the retaining plate and the cutting plate are thus substantially fully advanced, Block S160 can index the conveyor 120 forward to bring a subsequent topping vehicle adjacent the topping module, and Blocks S120, S130, and S140 can repeat, thereby releasing a topping serving from the topping module onto the subsequent topping vehicle. As described above, the processor can implement Block S150 by controlling the carriage actuator 134 to advance the retaining plate back into the cutting module.

Block S160 of method S100 recites indexing the first topping vehicle to the second position. Generally, Block S160 functions to index the conveyor 120 forward to place a topping vehicle in a subsequent topping position to receive a topping serving from a subsequent topping module, as described above. The processor can thus implement Block S160 by controlling the conveyor actuator to displace the topping vehicle forward into a subsequent topping module position. Method S100 can thus repeat Blocks S120, S130, S140, and S150—the topping serving dispense cycle—for the succeeding topping module to dispense a topping serving from the succeeding topping module onto the topping vehicle, such as based on a topping order corresponding to the topping vehicle.

As described above, cutting mechanisms of multiple topping modules can be actuated substantially simultaneously to dispense topping servings from multiple topping modules onto multiple topping vehicles substantially simultaneously. For example, Block S120 can include simultaneously retracting the first blade 116 and retracting a second blade 116b of the second topping module 110b, Block S130 can include simultaneously advancing the first blade 116 and advancing the second blade 116b through the second topping, Block S140 can include simultaneously retracting the first retaining plate 115 and retracting a second retaining plate 115b to dispense a topping slice from the second topping onto the second topping vehicle according to a second topping order for the second topping vehicle specifying the second topping type, and Block S150 can include simultaneously advancing the first retaining plate 115 and advancing the second retaining plate 115b, the second topping order specifying a combination of topping types different from the first topping order. Therefore, Blocks S120, S130, S140, and S150 can cooperate to dispense custom combinations of topping servings onto various topping vehicles according to corresponding topping orders.

Figure 5B:
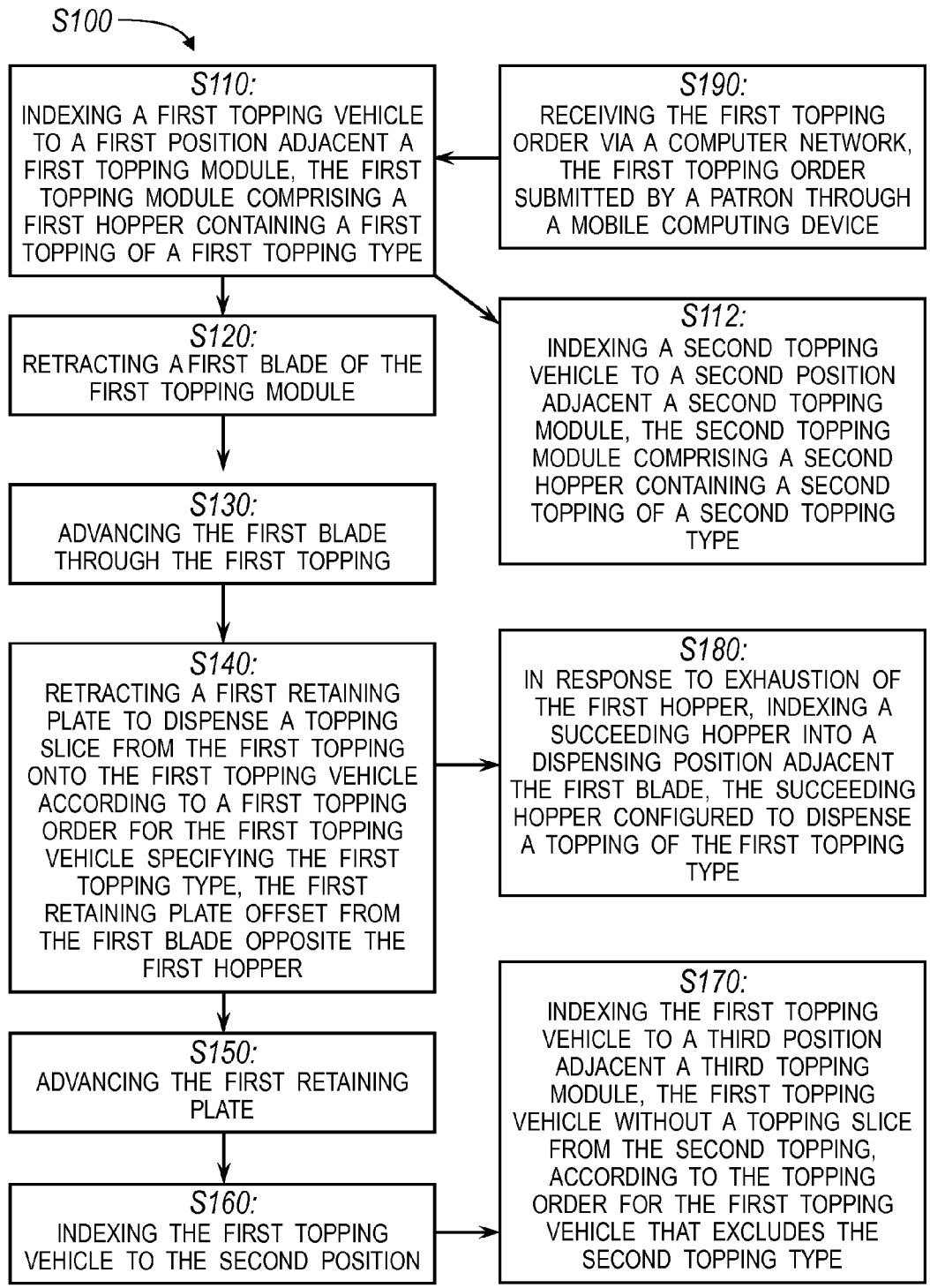
FIGS. 5B and 6 are flowchart representations of variations of the method.

As shown in FIG. 5B, one variation of method S100 further includes Block S170, which recites indexing the first topping vehicle to a third position adjacent a third topping module, the first topping vehicle without a topping slice from the second topping, according to the topping order for the first topping vehicle that excludes the second topping type. Generally, Block S170 functions to implement a custom topping order corresponding to the first topping vehicle, wherein the custom topping order specifies no topping serving from the third topping module. As described above, method S100 can transport multiple topping vehicles through multiple adjacent topping modules simultaneously, and topping vehicles can thus be in various stages of build at any given time. Method S100 (e.g., implemented by the processor) can cycle the carriage 130 each time a subsequent topping vehicle enters a dispense position adjacent a topping module, and Block S170 can function to prevent loading of a topping serving from a particular topping module onto a particular topping vehicle if a corresponding topping order does not specify the corresponding topping type. For example, Block S170 can function to maintain a corresponding selection actuator in a retaining plate position such that the corresponding retaining plate is cycled (i.e., retracted and advanced) twice during a topping serving dispense cycle rather than cycling the retaining plate and the cutting plate once each, which dispenses a topping serving. However, Block S170 can function in any other way to implement a topping order that excludes a particular topping type dispensed by a particular topping module.

As shown in FIG. 5B, one variation of method S100 includes Block S180, which recites, in response to exhaustion of the first hopper in, indexing a succeeding hopper into a dispensing position adjacent the first blade 116, the succeeding hopper configured to dispense a topping of the first topping type. Generally, Block S180 functions to move a full hopper into position over a corresponding cutting mechanism of a topping module once topping samples within a preceding hopper are exhausted. For example, the processor can implement machine vision techniques to analyze an output of an optical sensor adjacent a topping module to detect a topping level of a hopper in a dispense position, and the processor can subsequently implement Block S180 to control the hopper magazine to move a succeeding hopper into the dispense position in response to detection of an empty preceding hopper.

As shown in FIG. 5B, one variation of method S100 includes Block S190, which recites receiving the first topping order via a computer network, the first topping order submitted by a patron through a mobile computing device. Generally, Block S19 functions to receive a topping order and to assign the topping order to a particular topping vehicle. In one example, described above, the processor can implement Block S190 to receive a topping order entered into a native ordering application executing on a mobile computing device and submitted over a computer network (e.g., the Internet). In another example, the processor can implement Block S190 by receiving a topping order through a customer interface accessible through a web browser executing on an electronic device, such as a cellular phone, a smartphone, a tablet, or a desktop computer. In yet another example, the processor can implement Block S190 by receiving a topping order through a customer interface arranged on an automated foodstuff (e.g., hamburger) assembly system. However, Block S190 can function in any other way to receive a topping order though any other venue, network, and/or customer interface.

Systems, hoppers, cutting mechanisms, and methods of the embodiments can be embodied and/or implemented at least in part as a machine configured to receive a computer-readable medium storing computer-readable instructions. The instructions are can executed by computer-executable components can integrated with an application, applet, host, server, network, website, communication service, communication interface, hardware/firmware/software elements of a user computer or mobile device, or any suitable combination thereof. Other systems and methods of the embodiment can be embodied and/or implemented at least in part as a machine configured to receive a computer-readable medium storing computer-readable instructions. The instructions are can executed by computer-executable components can integrated by computer-executable components can integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for dispensing toppings onto topping vehicles, comprising:
    a first topping module comprising a first hopper and a first blade, the first hopper configured to dispense a first topping sample of a first topping type, the first blade adjacent a discharge end of the first hopper, defining a smooth leading edge, and configured to slice a topping serving from the first topping sample;
    a second topping module comprising a second hopper and a second blade, the second hopper configured to dispense a second topping sample of a second topping type distinct from the first topping type, and the second blade adjacent a discharge end of the second hopper, defining a serrated leading edge, and configured to slice a topping serving from the second topping sample;
    a conveyor configured to sequentially index a series of topping vehicles from a first position adjacent the first topping module to a second position adjacent the second topping module;
    a beam extending across the first topping module and the second topping module;
    a first selection actuator supported by the beam adjacent the first topping module and configured to selectively couple the first blade to the beam during a dispense cycle in response to entry of a first topping vehicle into the first position, the first topping order specifying a second combination of topping types comprising the first topping type;
    a second selection actuator supported by the beam adjacent the second topping module and configured to selectively decouple the second blade from the beam during the dispense cycle in response to entry of a second topping vehicle into the second position, the second topping order specifying a second combination of topping types excluding the second topping type and distinct from the first combination of topping types;
    a beam actuator configured to advance and retract the beam, relative to the first topping module and the second topping module, during the dispense cycle to slice a first topping serving from the first topping sample onto the first topping vehicle.

2. The system of claim 1, wherein the conveyor is configured to advance the first topping vehicle comprising one half of a hamburger bun from the first position to the second position, and wherein the first hopper defines an internal cross-section configured to accept the first topping sample comprising one of a whole pickle, a whole tomato, a whole onion, and a head of lettuce.

3. The system of claim 1, wherein the first topping module further comprises a first retaining plate adjacent the first blade opposite the first hopper; wherein the first hopper is configured to gravity feed the first topping sample onto the first retaining plate set in an advanced position, the first blade offset above from the first retaining plate by a first preset topping thickness specified for the first topping type; wherein the second topping module further comprises a second retaining plate adjacent the second blade opposite the second hopper; and wherein the second hopper is configured to gravity feed the second topping sample onto the second retaining plate set in an advanced position the second blade offset from the second retaining plate by a second preset topping thickness specified for the second topping type, the second preset topping thickness different from the first preset to in thickness.

4. The system of Claim 3 , wherein, in response to slicing the first topping serving from the first topping sample during the dispense cycle:
    the first selection actuator selects the first retaining plate to couple the first retaining plate to the beam;
    the second selection actuator deselects the second retaining plate to decouple the retaining plate from the beam;
    the beam actuator retracts the beam to release the first topping serving of the first topping type onto the first topping vehicle; and
    the beam actuator advances the beam to reset the first retaining plate in the first topping module.

5. The system of claim 1, wherein the first topping module further comprises a preceding hopper and a hopper magazine, wherein the preceding hopper dispenses topping samples of the first topping type, and wherein the hopper magazine supports the first hopper, supports the preceding hopper adjacent the first hopper and over the first blade to dispense the second topping sample toward the first blade, and advances the first hopper into a dispense position over the first blade in response to exhaustion of the topping samples from the preceding hopper.

6. The system of Claim $_5$, wherein the first topping module further comprises a chute arranged between the first blade and the discharge end of the first hopper, the chute defining an axial length less than an axial length of the first hopper, the magazine configured to axially align the preceding hopper with the chute and to axially align the first hopper with the chute in sequence.

7. The system of claim 1, wherein the first blade is transiently coupled to a leading edge of a cutting plate, wherein the cutting plate comprises a planar perforated region defining a series of bores of cross-section less than a cross-section of topping samples of the first topping type, the planar perforated region adjacent the first topping sample when the cutting plate is fully advanced through the first topping sample.

8. The system of claim 1, wherein the first actuator, the second actuator, and the beam actuator cooperate: to selectively dispense the first topping serving from the first topping module configured to dispense pickle in response to entry of the first topping vehicle into the first position; to selectively withhold the second topping serving from the second topping module configured to dispense tomato in response to entry of the second topping vehicle into the second position; to selectively dispense a fifth topping serving from the second topping module in response to entry of the first topping vehicle into the second position; to selectively dispense a third topping serving from a third topping module configured to dispense onion in response to entry of the first topping vehicle into a third position adjacent the third topping module; and to selectively dispense a fourth topping serving from a fourth topping module configured to dispense lettuce in response to entry of the first topping vehicle into a fourth position adjacent the third topping module based on the first topping order and the second topping order.

9. The system of claim 1, wherein the first topping module further comprises a heating element adjacent a discharge end of the first hopper and configured to heat topping samples contained in the first hopper.

10. A system for dispensing toppings onto a first topping vehicle, comprising:
 a first topping module comprising:
  a first hopper of a first axial length, defining a closed cross-section, and configured to dispense topping samples of a first topping type;
  a succeeding hopper configured to dispense topping samples of the first topping type;
  a first blade adjacent a discharge end of the first hopper, defining a smooth leading edge, and configured to slice a topping serving from a topping sample dispensed from the first hopper;
  a chute defining a second axial length less than the first axial length and interposed between the first blade and the discharge end of the first hopper; and
  a hopper magazine supporting the first hopper, supporting the succeeding hopper behind the first hopper, aligning the first hopper axially with the chute, and indexing the second hopper into position over the chute in response to exhaustion of topping samples from the first hopper;
 a second topping module comprising a second hopper and a second blade, the second hopper configured to dispense topping samples of a second topping type distinct from the first topping type, and the second blade adjacent a discharge end of the second hopper, defining a serrated leading edge, and configured to slice a topping serving from a topping sample dispensed from the second hopper;
 a conveyor configured to advance the first topping vehicle from a first position adjacent the first topping module to a second position adjacent the second topping module; and
 a set of actuators:
  configured to selectively retract and advance the first blade to dispense a topping serving from the first topping sample in response advancement of the first topping vehicle into the first position by the conveyor; and
  configured to selectively retract and advance the second blade independently of the first blade, to dispense a topping serving from the second topping sample onto the first topping vehicle in response to advancement of the first topping vehicle from the first position into the second position by the conveyor.

11. The system of claim 10, wherein the set of actuators comprises: a beam spanning the first topping module and the second topping module; a first selection actuator coupled to the beam and configured to selectively engage the first blade and the first retaining plate of the first topping module; a second selection actuator coupled to the beam and configured to selectively engage the second blade and the second retaining plate of the second topping module; and a beam actuator configured to advance and to retract the beam.

12. The system of Claim 11, further comprising a processor correlating a current draw of an actuator, in the set of actuators, advancing the beam with a sharpness of the first blade, and wherein the processor triggers an alarm in response to a determined blade sharpness below a threshold blade sharpness.

13. The system of claim 11, wherein the set of actuators cooperate to dispense a topping serving from the first topping sample onto the first topping vehicle in the first position by selecting the first blade in a fully-advanced position, retracting the first blade into a fully-retracted position, advancing the first blade into a fully-advanced position, disengaging the first blade, selecting the retaining plate in a fully-advanced position, retracting the retaining plate into a fully-retracted position to release the topping serving from the first topping sample, advancing the retaining plate into a fully-advanced position, and disengaging the retaining plate.

14. The system of claim 10, wherein the first topping module further comprises a heating element coupled to the chute and configured to heat topping samples contained in the first hopper aligned axially with the chute.

* * * * *